(12) United States Patent
King et al.

(10) Patent No.: US 9,213,445 B2
(45) Date of Patent: Dec. 15, 2015

(54) OPTICAL TOUCH-SCREEN SYSTEMS AND METHODS USING A PLANAR TRANSPARENT SHEET

(71) Applicant: Corning Incorporated, Corning, NY (US)

(72) Inventors: Jeffrey Stapleton King, Menlo Park, CA (US); Timothy James Orsley, San Jose, CA (US); William Richard Trutna, Atherton, CA (US); Richard Clayton Walker, Palo Alto, CA (US)

(73) Assignee: CORNING INCORPORATED, Corning, NY (US)

( * ) Notice: Subject to any disclaimer, the term of this patent is extended or adjusted under 35 U.S.C. 154(b) by 220 days.

(21) Appl. No.: 13/686,426

(22) Filed: Nov. 27, 2012

(65) Prior Publication Data

US 2013/0135258 A1    May 30, 2013

Related U.S. Application Data

(60) Provisional application No. 61/564,003, filed on Nov. 28, 2011.

(51) Int. Cl.
  *G06F 3/042* (2006.01)

(52) U.S. Cl.
  CPC ............ *G06F 3/0421* (2013.01); *G06F 3/0428* (2013.01); *G06F 2203/04109* (2013.01)

(58) Field of Classification Search
  CPC ........................................ G06F 3/042–3/0482
  USPC .................................................. 345/156–184
  See application file for complete search history.

(56) References Cited

U.S. PATENT DOCUMENTS

| | | | |
|---|---|---|---|
| 4,254,333 A | 3/1981 | Bergstrom | |
| 4,346,376 A | 8/1982 | Mallos | |
| 4,484,179 A | 11/1984 | Kasday | .......................... 340/365 |
| 4,511,760 A | 4/1985 | Garwin et al. | ................... 178/18 |
| 4,542,375 A | 9/1985 | Alles et al. | ..................... 340/712 |
| 4,673,918 A | 6/1987 | Adler et al. | |
| 4,687,885 A | 8/1987 | Talmage, Jr. et al. | ........... 178/18 |

(Continued)

FOREIGN PATENT DOCUMENTS

| | | |
|---|---|---|
| EP | 0901229 | 6/2007 |
| EP | 2392904 | 12/2011 |

(Continued)

OTHER PUBLICATIONS http://dl.dropbox.com/u/56644/MRS_RobertKoeppe.ppt.

(Continued)

*Primary Examiner* — Carolyn R Edwards
(74) *Attorney, Agent, or Firm* — Jason A. Barron

(57) ABSTRACT

An optical touch screen that utilizes a planar transparent sheet and that is configured to determine the position of a touch event on the transparent sheet is disclosed. Light-source elements and light-sensing elements are operably disposed at a perimeter of the transparent sheet. Light is detected over lines-of-sight between the light-source elements and the light-sensing elements. Attenuated lines-of-sight due to the touch event are determined. Central lines are established based on the attenuated lines-of-sight. The locations of central-line intersections are then established. The average of the locations of the central-line intersections is then used to establish the location of the touch event.

18 Claims, 12 Drawing Sheets

(56) References Cited

U.S. PATENT DOCUMENTS

| | | | |
|---|---|---|---|
| 4,703,316 A | 10/1987 | Sherbeck | |
| 4,725,978 A | 2/1988 | Fujioka | 364/900 |
| 5,222,400 A | 6/1993 | Hilton | 73/862.043 |
| 5,446,480 A | 8/1995 | Yoshida | 345/157 |
| 5,610,629 A | 3/1997 | Baur | 345/104 |
| 5,764,223 A | 6/1998 | Chang et al. | |
| 6,031,520 A | 2/2000 | De Gotari | 345/157 |
| 6,084,571 A | 7/2000 | De Gotari | 345/157 |
| 6,326,948 B1 | 12/2001 | Kobachi et al. | 345/157 |
| 6,504,530 B1 | 1/2003 | Wilson et al. | 345/173 |
| 6,556,149 B1 | 4/2003 | Reimer et al. | 341/20 |
| 6,788,295 B1 | 9/2004 | Inkster | 345/175 |
| 6,804,012 B2 | 10/2004 | Gombert | 356/614 |
| 6,816,537 B2 | 11/2004 | Liess | 372/109 |
| 6,900,795 B1 | 5/2005 | Knight, III et al. | 345/173 |
| 6,927,384 B2 | 8/2005 | Reime et al. | |
| 7,042,444 B2 | 5/2006 | Cok | |
| 7,098,592 B2 | 8/2006 | Nishikawa | |
| 7,157,649 B2 | 1/2007 | Hill | 178/18.04 |
| 7,158,054 B2 | 1/2007 | Pihlaja | 341/22 |
| 7,298,367 B2 | 11/2007 | Geaghan et al. | |
| 7,417,627 B2 | 8/2008 | Cok | 345/173 |
| 7,432,893 B2 | 10/2008 | Ma et al. | |
| 7,442,914 B2 | 10/2008 | Eliasson et al. | |
| 7,465,914 B2 | 12/2008 | Eliasson et al. | |
| 7,515,140 B2 | 4/2009 | Philipp | 345/173 |
| 7,685,538 B2 | 3/2010 | Fleck et al. | 715/863 |
| 7,705,835 B2 | 4/2010 | Eikman | |
| 7,786,978 B2 | 8/2010 | Lapstun et al. | 345/166 |
| 7,855,716 B2 | 12/2010 | McCreary et al. | |
| 7,903,090 B2 | 3/2011 | Soss et al. | 345/173 |
| 7,920,124 B2 | 4/2011 | Tokita et al. | 345/156 |
| 8,049,739 B2 | 11/2011 | Wu et al. | 345/175 |
| 8,130,210 B2 | 3/2012 | Saxena et al. | 345/175 |
| 8,179,375 B2 | 5/2012 | Ciesla et al. | 345/173 |
| 8,253,712 B2 | 8/2012 | Klinghult | 345/174 |
| 8,325,158 B2 | 12/2012 | Yatsuda et al. | 345/176 |
| 8,368,677 B2 | 2/2013 | Yamamoto | 345/207 |
| 8,378,975 B2 | 2/2013 | Yoon et al. | 345/173 |
| 8,390,481 B2 | 3/2013 | Pance et al. | 341/33 |
| 8,395,601 B2 | 3/2013 | Nho et al. | 345/176 |
| 8,411,068 B2 | 4/2013 | Lu et al. | 345/175 |
| 8,553,014 B2 | 10/2013 | Holmgren et al. | 345/176 |
| 2001/0007449 A1 | 7/2001 | Kobachi et al. | 345/156 |
| 2002/0175900 A1 | 11/2002 | Armstrong | |
| 2003/0026971 A1 | 2/2003 | Inkster et al. | 428/304.4 |
| 2004/0252091 A1* | 12/2004 | Ma | G06F 3/0421 345/87 |
| 2005/0191062 A1 | 9/2005 | Rafferty et al. | |
| 2005/0248540 A1 | 11/2005 | Newton | |
| 2006/0096392 A1 | 5/2006 | Inkster et al. | 73/862.041 |
| 2006/0158437 A1 | 7/2006 | Blythe et al. | |
| 2006/0279558 A1* | 12/2006 | Van Delden et al. | 345/176 |
| 2008/0068343 A1 | 3/2008 | Hoshino et al. | 345/173 |
| 2008/0088597 A1 | 4/2008 | Prest et al. | 345/173 |
| 2008/0088600 A1 | 4/2008 | Prest et al. | 345/173 |
| 2008/0122803 A1* | 5/2008 | Izadi | G06F 3/0421 345/175 |
| 2008/0284742 A1 | 11/2008 | Prest et al. | 345/173 |
| 2008/0284925 A1 | 11/2008 | Han | |
| 2008/0286548 A1 | 11/2008 | Ellison et al. | |
| 2008/0289884 A1 | 11/2008 | Elwell | 178/18.01 |
| 2008/0303797 A1 | 12/2008 | Grothe | 345/173 |
| 2009/0015564 A1 | 1/2009 | Ye et al. | 345/173 |
| 2009/0073142 A1 | 3/2009 | Yamashita et al. | |
| 2009/0103853 A1* | 4/2009 | Daniel | G02B 6/0068 385/13 |
| 2009/0153519 A1 | 6/2009 | Suarez Rovere | |
| 2009/0189878 A1 | 7/2009 | Goertz et al. | |
| 2009/0215607 A1 | 8/2009 | Dejneka et al. | |
| 2009/0219253 A1 | 9/2009 | Izadi et al. | 345/173 |
| 2009/0219261 A1 | 9/2009 | Jacobson et al. | 345/175 |
| 2010/0001978 A1 | 1/2010 | Lynch et al. | 345/175 |
| 2010/0060548 A1 | 3/2010 | Choi et al. | 345/1.3 |
| 2010/0079407 A1 | 4/2010 | Suggs | |
| 2010/0085329 A1 | 4/2010 | Tseng et al. | |
| 2010/0090969 A1 | 4/2010 | Zhao et al. | |
| 2010/0103123 A1 | 4/2010 | Cohen et al. | 345/173 |
| 2010/0103140 A1 | 4/2010 | Hansson | 345/175 |
| 2010/0117974 A1 | 5/2010 | Joguet et al. | 345/173 |
| 2010/0117989 A1 | 5/2010 | Chang | 345/175 |
| 2010/0156847 A1 | 6/2010 | No et al. | 345/175 |
| 2010/0182168 A1 | 7/2010 | Van De Wijdeven et al. | |
| 2010/0207906 A1 | 8/2010 | Anglin et al. | 345/174 |
| 2010/0245288 A1 | 9/2010 | Harris | 345/175 |
| 2010/0253650 A1 | 10/2010 | Dietzel et al. | 345/175 |
| 2010/0295821 A1 | 11/2010 | Chang et al. | |
| 2010/0302209 A1 | 12/2010 | Large | |
| 2010/0321310 A1 | 12/2010 | Kim et al. | 345/173 |
| 2011/0141053 A1 | 6/2011 | Bulea et al. | 345/174 |
| 2011/0148819 A1 | 6/2011 | Yu | |
| 2011/0157044 A1* | 6/2011 | Yu | G06F 3/0428 345/173 |
| 2011/0157092 A1 | 6/2011 | Yang | 345/175 |
| 2011/0163997 A1 | 7/2011 | Kim | |
| 2011/0199340 A1 | 8/2011 | Aikio et al. | |
| 2011/0221997 A1 | 9/2011 | Kim et al. | |
| 2011/0227874 A1 | 9/2011 | Fahraeus et al. | |
| 2011/0234537 A1 | 9/2011 | Kim | |
| 2011/0298742 A1 | 12/2011 | Dingnan | 345/173 |
| 2012/0038593 A1 | 2/2012 | Ronka et al. | |
| 2012/0068939 A1 | 3/2012 | Pemberton-Pigott | 345/173 |
| 2012/0068970 A1 | 3/2012 | Pemberton-Pigott | 345/175 |
| 2012/0068971 A1 | 3/2012 | Pemberton-Pigott | 345/175 |
| 2012/0071206 A1 | 3/2012 | Pemberton-Pigott | 455/566 |
| 2012/0092250 A1 | 4/2012 | Hadas et al. | 345/156 |
| 2012/0176345 A1 | 7/2012 | Ye et al. | 345/175 |
| 2012/0212441 A1* | 8/2012 | Christiansson | G06F 3/0416 345/173 |
| 2012/0212451 A1 | 8/2012 | Large et al. | 345/175 |
| 2012/0242607 A1 | 9/2012 | Ciesla et al. | 345/173 |
| 2012/0326981 A1 | 12/2012 | Kurose | 345/160 |
| 2013/0107306 A1 | 5/2013 | Yoon et al. | 358/1.13 |
| 2013/0135254 A1 | 5/2013 | Lee et al. | 345/175 |

FOREIGN PATENT DOCUMENTS

| | | |
|---|---|---|
| EP | 2437144 | 4/2012 |
| EP | 2437145 | 4/2012 |
| EP | 2439620 | 4/2012 |
| EP | 2439619 | 5/2012 |
| FR | 2963839 | 8/2010 |
| GB | 2313195 | 11/1997 |
| GB | 2448564 A * | 10/2008 |
| JP | 2011103094 | 5/2011 |
| WO | 02/35460 | 5/2002 |
| WO | 2010/063320 | 6/2010 |
| WO | 2011028169 | 3/2011 |
| WO | 2011028170 | 3/2011 |
| WO | 2011/049511 | 4/2011 |
| WO | 2011049513 | 4/2011 |
| WO | 2011078769 | 6/2011 |
| WO | 2011095638 | 8/2011 |
| WO | 2012/027599 | 3/2012 |
| WO | 2012/087286 | 6/2012 |
| WO | 2013/029641 | 3/2013 |
| WO | 2013/037385 | 3/2013 |
| WO | 2013/068651 | 5/2013 |

OTHER PUBLICATIONS

Kristen L. Barefoot et al.; U.S. Appl. No. 12/537,393; entitled "Strengthened Glass Articles and Methods of Making".

Jaymin Amin et al.; U.S. Appl. No. 12/545,475; entitled "Durable Glass Housings/Enclosures for Electronic Devices".

(56) References Cited

OTHER PUBLICATIONS

Sumriddetchkajorn et al.; "Ultra-High Contrast Low-Leadage-Light Optical Touch Device Structures Using Light Scattering and Total Internal Reflection Concepts"; Sensors and Actuators A, 126 (2006) 68-72.

G. Kodl.; "A New Optical Waveguide Pressure Sensor Using Evanescent Field"; IEEE, 2004 Electronic Components and Technology Conference, pp. 1943-1946.

Machine translation of JP2011-103094.

Machine translation of FR2963839.

* cited by examiner

OPTICAL TOUCH-SCREEN SYSTEMS AND METHODS USING A PLANAR TRANSPARENT SHEET

This application claims the benefit of priority under 35 USC §119 of U.S. Provisional Application Ser. No. 61/564,003 filed Nov. 28, 2011 the content of which is relied upon and incorporated herein by reference in its entirety.

FIELD

The present invention relates to optical touch screens, and in particular to optical touch screen systems and methods that use a planar transparent sheet.

BACKGROUND ART

The market for displays having touch-screen functionality is rapidly growing. As a result, a variety of sensing techniques have been developed to enable displays to have touch-screen functionality. However, the existing techniques each have some type of performance disadvantage for specific applications that results in significant added cost to the manufacturing of the display.

Touch-screen functionality is gaining wider use in mobile device applications, such as smart phones, e-book readers, laptop computers and tablet computers. In addition, fixed displays, such as for desktop computers and wall-mounted screens, are getting even larger. This increase in display size is accompanied by an increase in the display cost when using a conventional touch-screen technology, such as projected capacitive touch (PCAP) technology.

Consequently, there is a need to minimize the overall thickness and weight of touch-screens for the wide range of applications, from the smallest hand-held devices to the largest displays. Moreover, there is also a need for touch-screens to have more robust functionality, such as improved touch position accuracy, fingerprint immunity and multi-touch capability while controlling costs.

SUMMARY

An aspect of the disclosure is a touch-screen system for sensing a location of a touch event. The system includes a transparent sheet having a top surface, a bottom surface, and a perimeter that includes an edge. The touch event occurs on the top surface. The system has a plurality of light-source elements that emit light and that are disposed adjacent the perimeter of the transparent sheet either adjacent the edge or adjacent the bottom surface substantially at the edge. Light is coupled into the transparent sheet to travel therein via total internal reflection. The touch-screen system also has a plurality of light-sensing elements operably disposed adjacent the edge to detect the light that travels within the transparent sheet and along lines-of-sight from each of the light sources to the light-sensing elements. The light-sensing elements are configured to generate detector signals having a signal strength representative of a detected light intensity, wherein the touch event causes attenuation of the light intensity along at least one of the lines-of-sight. The touch-screen system includes a controller operably coupled to the light-source elements and the light-sensing elements. The controller is configured to control the emission of the light from the light-source elements and process the detector signals to compare the detector signal strength to a signal threshold to establish attenuated lines-of-sight. The controller is also configured to define central lines associated with the attenuated lines of sight, to establish a plurality of locations of intersections of the central lines, and to average the plurality of intersection locations to establish the touch-event location.

In some embodiments, the transparent sheet is substantially transparent to infrared (IR) light, wherein the emitted light from the light sources comprises IR light, and wherein the light-sensing elements are configured to detect the IR light. In some embodiments, wherein the transparent sheet includes at least four corners, and wherein four of the light-sensing elements are respectively operably arranged at each of the four corners. In some embodiments, the system further comprises a slab waveguide disposed between the bottom of the transparent sheet and one of the light-sensing elements such that the lines-of-sight pass through the slap waveguide. In some embodiments, the system further comprises an IR-transparent layer disposed atop a first portion of the slab waveguide upper surface, the IR-transparent layer being opaque to visible light. In other embodiments, the system further comprises a reflecting layer disposed atop a second portion of the waveguide upper surface and adjacent the first portion, the reflecting layer being opaque to visible and IR light; wherein the IR-transparent layer allows IR light from the light-source elements to pass into the slab waveguide and travel therein via total internal reflection, and wherein the reflecting layer reflects the internally reflected IR light to the light-sensing element and blocks ambient light from being directly incident upon the light-sensing element. In still other embodiments, the system further comprises further comprising a display unit disposed adjacent the bottom surface of the transparent sheet so that a user views the display unit through the transparent sheet. In some embodiments, the light emitted by the light-source elements comprises infrared light, wherein the light-source elements are disposed adjacent the bottom surface of the transparent sheet substantially adjacent the perimeter, and further comprising an IR-transparent film between the light-source elements and the transparent sheet, wherein the IR-transparent film is opaque to visible light.

Another aspect of the disclosure is a method of determining a location of a touch event on a transparent sheet. The method includes sending light from light-source elements to light-sensing elements over lines-of-sight therebetween. The light-source elements and light-sensing elements are operably disposed adjacent a perimeter of the transparent sheet, and the light travels within the transparent sheet via total internal reflection. The method includes determining the lines-of-sight over which light is attenuated by the touch event, thereby defining attenuated lines-of-sight. The method also includes defining a central line for the attenuated lines-of-sight associated with each light-sensing element. The method further includes determining locations of intersections of the central lines, and averaging the locations of the intersections of the central lines to establish the location of the touch event.

It is to be understood that both the foregoing general description and the following Detailed Description represent embodiments of the disclosure, and are intended to provide an overview or framework for understanding the nature and character of the disclosure as it is claimed. The accompanying drawings are included to provide a further understanding of the disclosure, and are incorporated into and constitute a part of this specification. The drawings illustrate various embodiments of the disclosure and together with the description serve to explain the principles and operations of the disclosure.

In some embodiments, the method further comprises determining the intensity of the touch event based on a comparison of the detector signal strength to a signal threshold. In some embodiments, the method further comprises the light from the light-source elements having an infrared wavelength. In some embodiments, the transparent sheet has four edges that define four corners, and further comprising arranging the light-source elements along the four edges and arranging four of the light-sensing elements one at each of the four corners. In some embodiments, the method further comprises sequentially activating the light-source elements to sequentially send the light over the lines-of-sight. In some embodiments, the method further comprises detecting the light at the light-sensing elements to generate respective detector signals each having strength representative of an intensity of the detected light; and wherein said determining of the lines-of-sight over which light is attenuated by the touch event includes processing the detector signals to compare the detector signal strength to a threshold signal strength.

In some embodiments, the method further comprises establishing a baseline measurement of light traveling over the lines-of-sight; defining the threshold signal strength based on the baseline measurement; and comparing the detector signal strengths associated with the attenuated lines-of-sight to the threshold signal strength to determine whether the touch event occurred. In other embodiments, the method further comprises adjusting the baseline measurement based on changes in the detector signal strength; and adjusting the threshold signal strength based on the adjusted baseline measurement. In some embodiments, the method further comprises operably disposing a display unit underneath the transparent sheet. In other embodiments, the method further comprises determining a maximum number $N_M$ of central-line intersections for the touch event via the relationship $N_M=p(p-1)/2$, wherein p is the number of light-sensing elements; measuring a number $N_A$ of actual central line intersections and comparing $N_A$ to $N_M$ to determine whether the actual number of touch events is greater than one. In other embodiments, the method further comprises identifying a number Q of central-line intersections equal to or greater than a minimum number M of central-line positions that are all within a certain distance tolerance D of each other; and averaging the Q central-line positions to determine a location of one of the multiple touch events. In other embodiments, the method further comprises disposing the light-sensing elements adjacent a slab waveguide such that the lines-of-sight pass through the slab waveguide. In other embodiments, the method further comprises viewing a display unit through the transparent sheet.

Additional features and advantages of the disclosure are set forth in the detailed description that follows, and in part will be readily apparent to those skilled in the art from that description or recognized by practicing the disclosure as described herein, including the detailed description that follows, the claims, and the appended drawings. The claims are incorporated into and constitute part of the Detailed Description set forth below.

Additional features and advantages of the disclosure are set forth in the Detailed Description that follows and will be apparent to those skilled in the art from the description or recognized by practicing the disclosure as described herein, together with the claims and appended drawings.

Cartesian coordinates are shown in certain of the Figures for the sake of reference and are not intended as limiting with respect to direction or orientation.

DETAILED DESCRIPTION

Figure 1:
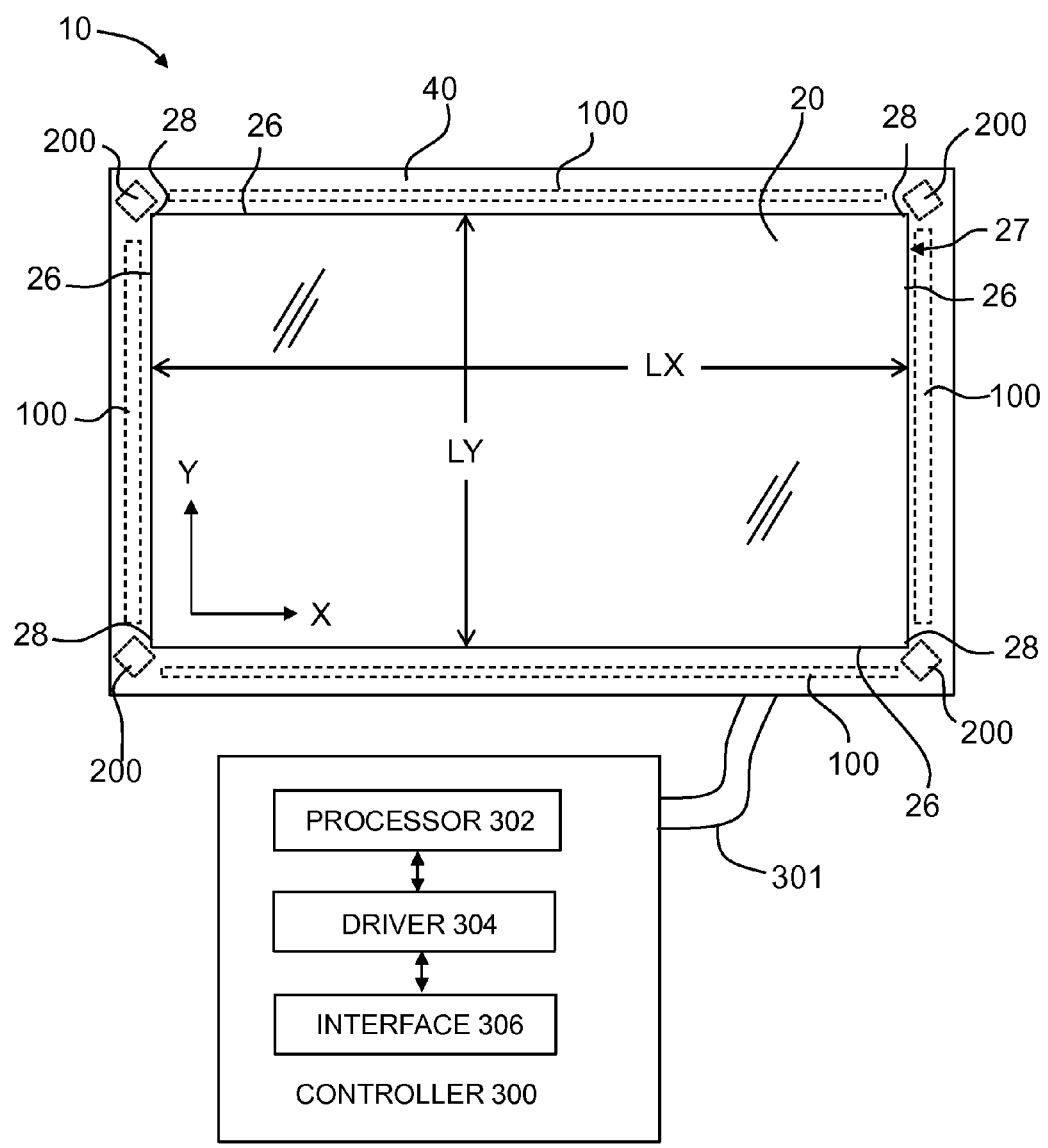
FIG. 1 is a face-on view of an example touch-screen system according to the disclosure.

FIG. 1 is a schematic diagram of an example touch-screen system 10 according to the disclosure. The touch-screen system 10 may be used in a variety of consumer electronic articles, for example, in conjunction with displays for cellphones and other electronic devices capable of wireless communication, music players, notebook computers, mobile devices, game controllers, computer "mice," electronic book readers and the like.

The touch-screen system 10 includes a transparent sheet 20, with light sources 100 and light-sensing elements 200 disposed adjacent the transparent sheet perimeter as discussed below. An optional bezel 40 serves to cover light sources 100 and light-sensing elements 200 so that they cannot be seen from above by a viewer. The term "bezel" is used broadly herein to mean any light-blocking member, film, component, etc., that serves to block at least visible light and that is configured to keep some portion of touch-screen system 10 from being viewed by a user 500 (see FIG. 14B). Thus, the term "bezel" as used herein is not limited to being a member located at the edge of the transparent sheet like a conventional mechanical bezel used for wristwatches, etc.

The touch-screen system 10 includes a controller 300 that is operably connected to light sources 100 and light-sensing elements 200 (e.g., via a bus 301) and configured to control the operation of touch-screen system 10. The controller 300 includes a processor 302, a device driver 304 and interface circuit 306, as described in greater detail below. In an example, light-sensing elements 200 comprise photodiodes.

Figure 2:
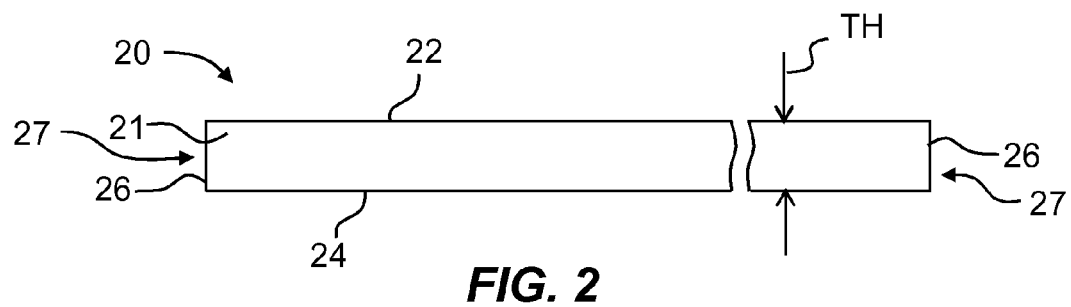
FIG. 2 is a cross-sectional view of the transparent sheet of the touch-screen system.
Figure 3:
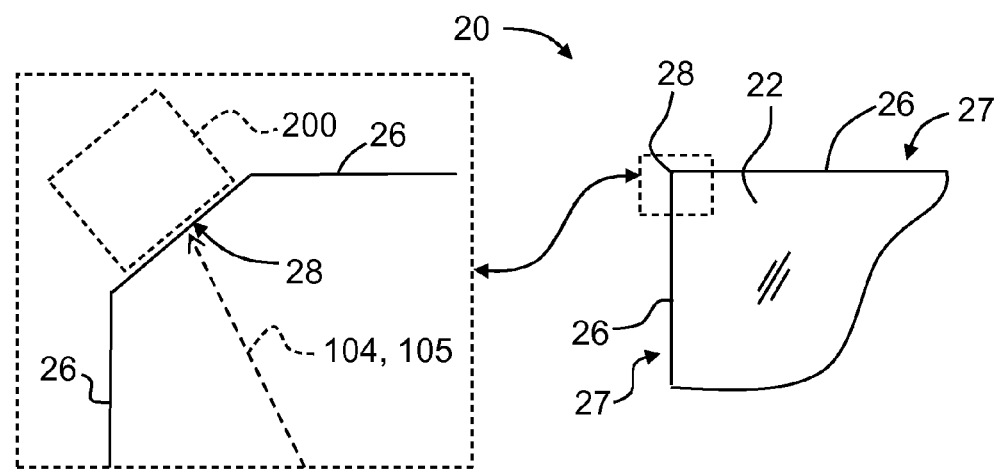
FIG. 3 is a close-up, top-down view of a corner of the transparent sheet, and includes a close-up inset illustrating an example where the corner is beveled and wherein a light-sensing element (shown in phantom) is disposed adjacent the beveled corner.

FIG. 2 is a cross-sectional view of transparent sheet 20, and FIG. 3 is a close-up, top-down view of the corner of the transparent sheet. The transparent sheet 20 includes a bulk portion or body 21, a top surface 22, a bottom surface 24 and at least one edge 26 that defines a perimeter 27 An example transparent sheet 20 is generally rectangular and includes four edges 26 that define four corners 28, and this example of the transparent sheet is used in the discussion below by way of illustration. Other shapes for transparent sheet 20 may be used, such a circular.

The close-up inset in FIG. 3 illustrates an example embodiment where one of the corners 28 is beveled, and shows in phantom one of the light-sensing elements 200 operably disposed adjacent the beveled corner. Also shown in phantom in the close-up inset is light 104 traveling over a line-of-sight 105, as described below.

The transparent sheet 20 has a thickness TH, which is substantially uniform (i.e., top and bottom surfaces 22 and 24 are substantially parallel). In an example, transparent sheet 20 is rectangular and has a dimension (length) LX in the X-direction and a length LY in the Y-direction, and so has four corners 28 defined by four edges 26. Generally, transparent sheet 20 can have a shape wherein edges 26 define multiple corners 28 (e.g., six corners for a hexagonal shape).

The transparent sheet 20 may generally be made of any suitably transparent material that can be formed into a thin planar sheet, such as plastic, acrylic, glass, etc., and that supports the transmission of light within its body 21 without substantial loss due to scattering or absorption. In an embodiment, transparent sheet 20 may be a chemically strengthened glass, such as a soda-lime-type glass. An example glass for transparent sheet 20 is an alkali aluminosilicate glass hardened through ion exchange. These types of glass can comprise $Na_2O$ (soda), $CaO$ (lime) and $SiO_2$ (silica), but can also include oxides such as $MgO$, $Li_2O$, $K_2O$, $ZnO$, and $ZrO_2$. Once hardened through ion exchange, these types of glass exhibit certain characteristics that make them desirable for touch screen applications, as well as other applications (e.g., as a cover glass). Further details as to the formulation or production, or both, of soda-lime-type glass suitable for use as transparent sheet 20 may be found in one or more of U.S. patent application Ser. No. 11/888,213 filed Jul. 31, 2007; U.S. patent application Ser. No. 12/537,393 filed Aug. 7, 2009; U.S. patent application Ser. No. 12/545,475 filed Aug. 21, 2009; and U.S. patent application Ser. No. 12/392,577 filed Feb. 25, 2009, which patent applications are incorporated by reference herein. An exemplary glass for transparent sheet 20 is Gorilla® glass, from Corning, Inc., Corning, N.Y. Also, an exemplary glass, such as low-iron Gorilla® glass or other low-iron ion-exchanged glass, is transparent to IR-wavelength light 104.

Figure 4:
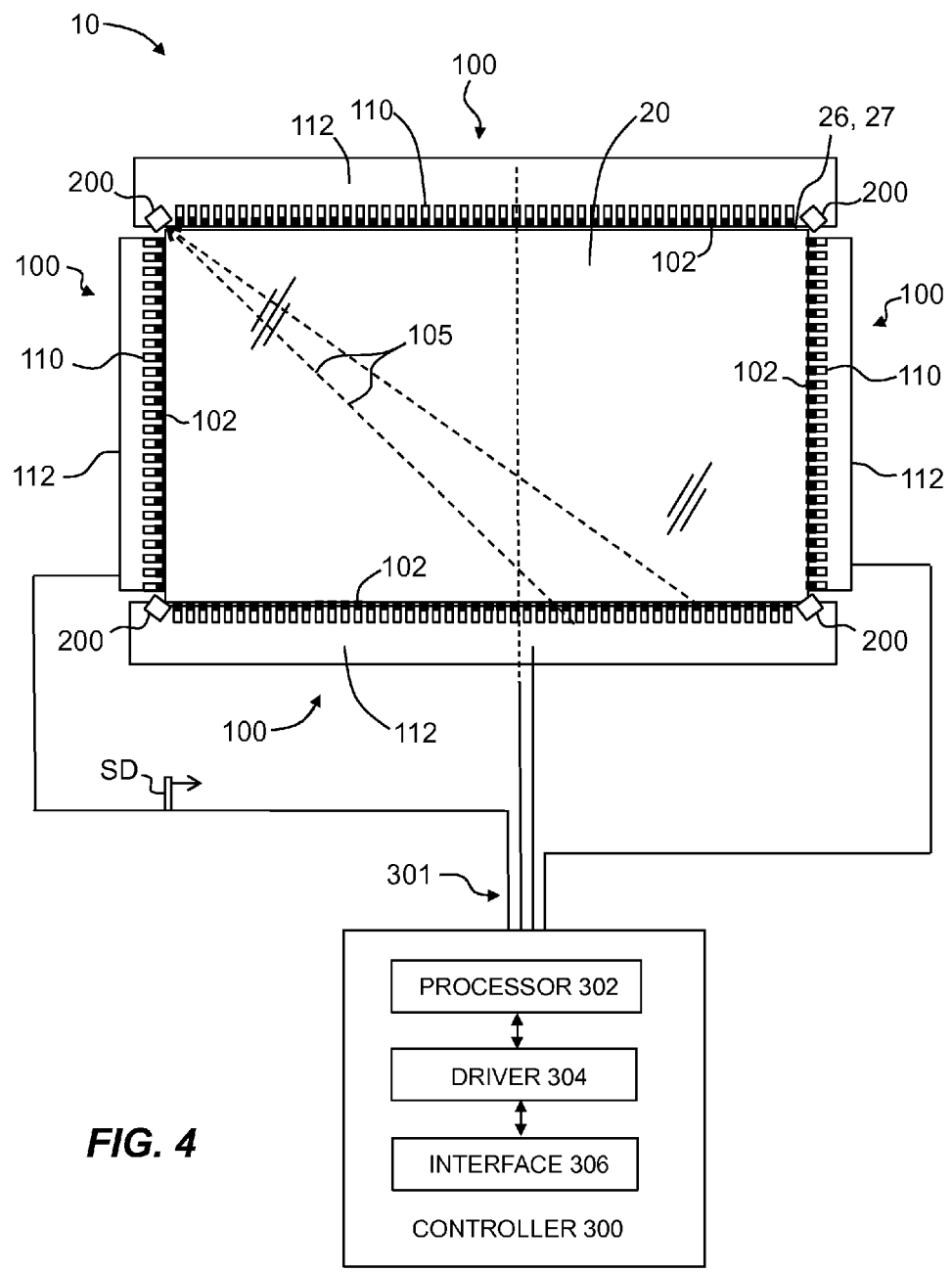
FIG. 4 is a more detailed face-on view of the example touch-screen system of FIG. 1, and shows example lines-of-sight associated with one of the light-sensing elements.

FIG. 4 is a schematic diagram of a touch-screen system 10 that is similar to that of FIG. 1 but that shows more details of the system and omits bezel 40 for ease of illustration. The light sources 100 are actually light source arrays that include light-source elements 102 shown operably disposed adjacent perimeter 27 of transparent sheet 20. An example light-source element 102 is a light-emitting diode (LED). Also in an embodiment, light-source elements 102 each emit light 104 at an IR wavelength, such as between 850 nm and 950 nm. In the discussion below, light 104 is also referred to as "light ray" 104 or "light rays" or "light beam" 104 or "light beams" 104 where appropriate.

FIG. 4 shows example lines-of-sight 105 between one of the light-source elements 102 and the corresponding example light-sensing elements 200. Note that in the example of a rectangular transparent sheet 20, each light-source element 102 has lines-of-sight 105 with the two light-sensing elements 200 on corners 28 of the opposite edge 26. Thus, for the rectangular configuration of transparent sheet 20, light 104 from each light-source element 102 is incident upon two light-sensing elements 200 along respective lines-of-sight 105.

In an example, light-source elements 102 are operably mounted on flex-circuit boards ("flex circuits") 110, which in turn are mounted to printed circuit boards (PCB) 112 associated with each edge 26 of transparent sheet 20. In an embodiment, light-source elements 102 are edge-coupled to transparent sheet 20 at edges 26, as discussed in greater detail below. Flex circuits 110 and PCBs 112 are shown in FIG. 4 as being oriented in a plane parallel to transparent sheet 20 by way of example. The flex circuits 110 and PCBs 112 can also be oriented in a plane perpendicular to transparent sheet 20.

In the general operation of touch-screen system 10, processor 302 drives the sequential activation of light-source elements 102 and also controls the detection of light 104 at light-sensing elements 200 for each light-source activation. The light-sensing elements 200 generate an electrical detector signal SD in response to detecting light 104, wherein the strength of the detector signal is representative of the intensity of the detected light for the particular line-of-sight 105 over which the light travels. Thus, each line-of-sight 105 can be considered as an optical path that has associated therewith a certain light intensity. Portions of the interface circuit 306 can be placed near the light-sensing elements 200. For example, preamplifiers and analog-to-digital converters may be placed near light-sensing elements 200 to eliminate noise that may be induced in long wires between processor 302 and the light-sensing elements 200, particularly when the processor is centrally located.

In an example, processor 302 controls the light emission and detection process to optimize the detection of light 104, e.g., by providing a characteristic (e.g., a modulation) to the light 104 from the light-source elements 102, or by gating light-sensing elements 200 to reduce noise, etc., or both.

Figure 5:
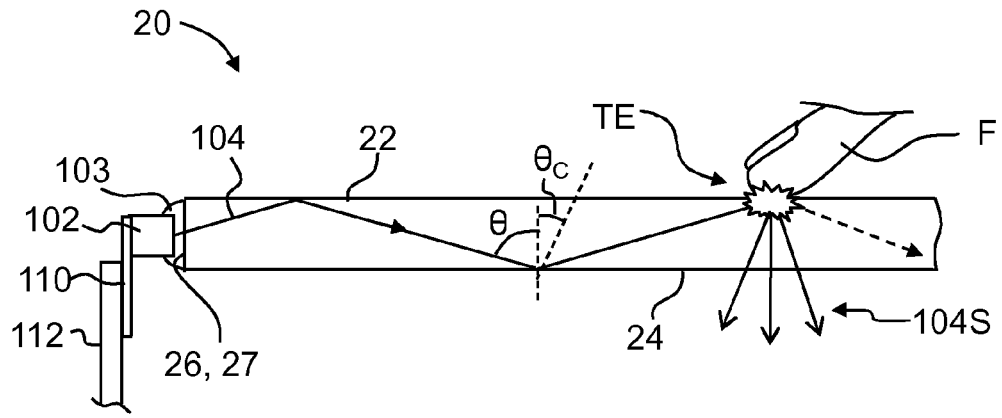
FIG. 5 is a close-up cross-sectional view of the transparent sheet at an edge 26, showing an example of how a light-source element is edge-coupled to the transparent sheet.

FIG. 5 is a close-up cross-sectional view of transparent sheet 20 at one of the edges 26, showing an example of how a light-source element 102 is optically coupled to the transparent sheet. In the example of FIG. 5, light-source element 102 is edge-coupled to edge 26 of transparent sheet 20 using, for example, a glue or adhesive 103. Note also that FIG. 5 illustrates an example embodiment wherein flex circuit 110 and PCB 112 are arranged perpendicular to the plane of transparent sheet 20. In an example, glue or adhesive 103 is index matched to the refractive index of transparent sheet 20.

When a given light-source element 102 is activated, it emits light 104 (light rays) that travels into body 21 of transparent sheet 20. The portion of light 104 that has an angle beyond a critical internal reflection angle $\theta_C$ (see FIG. 5) of transparent sheet 20 remains trapped in transparent sheet body 21 via total internal reflection and travels therein. If the travel of internally reflected light 104 remains uninterrupted, it will travel over the length of its line-of-sight 105 and arrive at the corresponding light-sensing element 200. The light-sensing elements 200 are configured to convert the detected light 104 in the aforementioned electrical detector signal SD, which in an example is a photocurrent. The electrical detector signal SD is then sent to processor 302 for processing, as described below. Thus, transparent sheet 20 acts as an optical waveguide that supports a larger number of guided modes, i.e., light rays 104 that travel within the transparent sheet over a wide range of an internal reflection angle $\theta$ beyond critical internal reflection angle $\theta_C$.

Figure 6A:
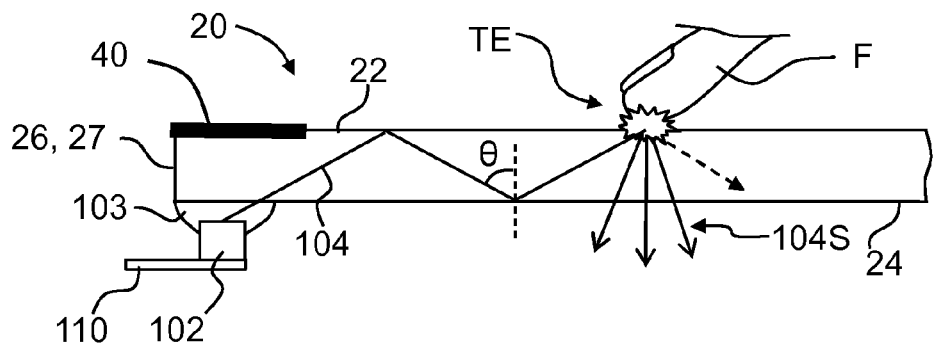
FIG. 6A is similar to FIG. 5 and shows an example where the light-source element is face-coupled to the transparent sheet at the bottom surface, and also shows a bezel disposed on the top surface to block the light-source element from view from above.

FIG. 6A is similar to FIG. 5 and illustrates an alternative embodiment wherein light-source element 102 is disposed adjacent bottom surface 24 of transparent sheet 20 and is optically coupled thereto. This face-coupling configuration offers several advantages over the edge-coupling configuration, including simpler manufacturing, no bezel requirement, and increased touch sensitivity. When light 104 is launched into transparent sheet 20, multiple modes propagate at different bounce angles as discussed above in connection with the edge-coupling configuration. The edge-coupling configuration is more likely to generate modes at low bounce angles, while the surface-coupling configuration generates modes at higher bounce angles. Light rays 104 with higher bounce angles provide increased touch sensitivity because they strike top surface 22 more frequently, thereby providing a greater opportunity to interact with a touch event TE.

To keep light-source elements 102 from being seen through transparent sheet 20 by user 500, bezel 40 can be employed. In an example, bezel 40 is in the form of a film that is opaque at least at visible wavelengths and that optionally transmits at IR wavelengths. An example film for bezel 40 comprises a black paint that absorbs light over a wide range of wavelengths including the visible and IR wavelengths. In another example illustrated in FIG. 6B, bezel 40 can be disposed between light-source element 102 and bottom surface 24 of transparent sheet 20, in which case the bezel needs to be substantially transparent to the wavelength of the light-emitting element. In this case, a convenient wavelength of light 104 is an IR wavelength.

Modeling indicates that about 28% of light 104 outputted by light-source element 102 can be trapped within transparent sheet 20 using the face-coupling configuration of FIG. 6, as compared to about 80% for the edge-coupling configuration of FIG. 5.

Figure 6B:
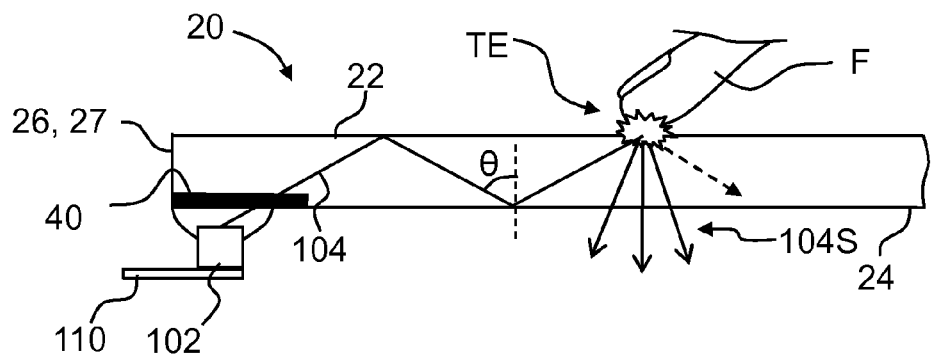
FIG. 6B is similar to FIG. 6A and shows an example where the bezel is transparent to infrared (IR) radiation but opaque to visible radiation, with the bezel disposed between the light-source element and the bottom of the transparent sheet.

With continuing reference to FIG. 5 and FIGS. 6A and 6B, when a touch event TE occurs, such as when a person's finger F touches top surface 22 of transparent sheet 20, it changes the total internal reflection condition. This causes light 104 to be scattered out of transparent sheet body 21 as scattered light 104S at the point (or more accurately, over the small area) where top surface 22 is touched, thereby attenuating light beam 104. The reduction in the intensity of light 104 arriving at the corresponding light-sensing elements 200 for the corresponding lines-of-sight 105 gives rise to a diminished signal strength (e.g., a reduced photocurrent) for electrical detector signal SD (as compared to, say, a baseline photocurrent measurement), and indicates that a touch event TE has occurred. A threshold value T for the measured electrical detector signal SD can be used to determine whether a touch event TE has occurred, as discussed in greater detail below.

Figure 7:
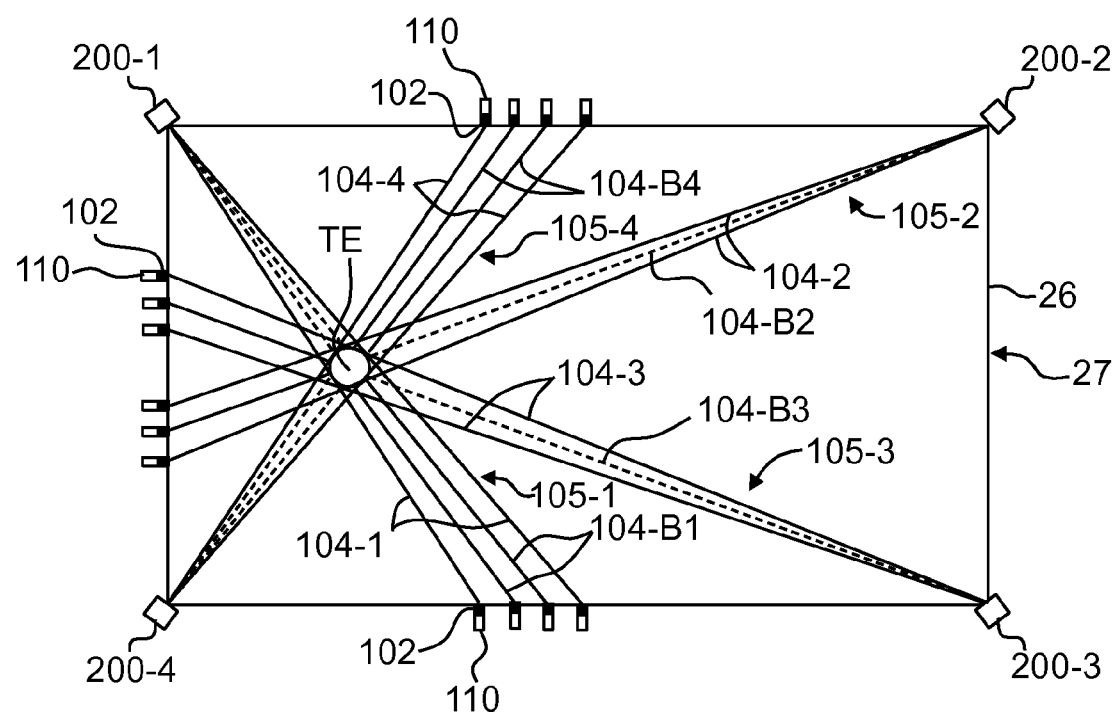
FIG. 7 is a face-on view of the transparent sheet, the light source elements and light-sensing elements of the touch screen system, illustrating a step in the method of determining the position of a touch event by measuring the attenuation (blocking) of fans of light rays as measured by the light-sensing elements.

FIG. 7 is a face-on view of transparent sheet 20, light-source elements 102 and light-sensing elements 200, illustrating how the occurrence and location of a touch event TE are determined. As discussed above, light 104 from a given light-source element 102 has a line-of-sight 105 to the light-sensing elements 200 located opposite the light-source element (i.e., not associated with the corners 28 of the same edge 26). FIG. 7 shows the limiting light beams 104-1, 104-2, 104-3 and 104-4 and the corresponding attenuated or "broken" light beams 104-B1, 104B2, 104B3 and 104-B4 that define respective lines-of-sight 105-1, 105-2, 105-3 and 105-4 for light-sensing elements 200-1, 200-2, 200-3 and 200-4 based on an example touch event TE. An accurate position of touch event TE is determined using the algorithm described below.

The position resolution of touch event TE is determined by the density of light-source elements 102 at the edges 26 of transparent sheet 20, which in turn defines the density of the lines-of-sight 105. Consider an example configuration of touch-screen system 10 where transparent sheet 20 has length LX=432 mm and length LY=254 mm, with 252 light-source elements 102 distributed about edges 26, with 80 of the light-source elements along the long edges and 46 of the light-source elements along the short edges. For a touch event TE having a circular size of 10 mm in diameter (which is about the size of a finger touch), a pitch for light-source elements 102 of 5.25 mm ensures that the touch event TE would break at least one light beam 104, i.e., would intercept at least one line-of-sight 105.

The controller 300 is configured to provide the functionality necessary to activate light-source elements 102 so that they emit light 104 in a select manner. The controller 300 is also configured to receive and process electrical detector signals SD from light-sensing elements 200 to determine the one or more positions on top surface 22 of transparent sheet 20 at which a touch event TE occurs.

In particular, with reference again to FIG. 4, controller 300 includes the aforementioned processor 302 (e.g., a microprocessor), the aforementioned device driver (driver circuit) 304, and the aforementioned interface circuit 306. The processor 302 is coupled to driver circuit 304 and interface circuit 306 via signal lines, buses, or the like. The processor 302 is configured to execute computer readable code (software programs) that controls and orchestrates the activities of driver circuit 304 and interface circuit 306 to achieve the aforementioned functions and operations and to carry out various calculations for the methods described herein. For example, processor 302 may provide control signals (not shown) to driver circuit 304 indicating when to activate and de-activate (i.e., turn on and turn off) the respective light-source elements 102 as well as light-sensing elements 200.

The interface circuit 306 receives electrical detector signals SD from the light-sensing elements 200 and processes these signals so that they may be input into processor 302. For example, when light-sensing elements 200 comprise photodiodes, interface circuit 306 may provide appropriate biasing conditions to the photodiodes such that they are able to properly sense light 104. In this regard, interface circuit 306 may be configured to cause certain light-sensing elements 200 to be active and others inactive during particular intervals of time.

The interface circuit 306 may also be configured (e.g., with an integrate-and-dump circuit, not shown) to process analog electrical detector signals SD (e.g., an analog photocurrent) from the photodiodes and convert same to a digital format for processor 302. This configuration improves the signal-to-noise ratio. Two example options for electrically connecting light-source elements 102 and light-sensing elements 200 to controller 300 are a daisy-chain using a bus such as an I$^2$C (two-wire interface) or home runs from the controller to each individual light-sensing element. The former option simplifies wiring while the latter improves performance.

The controller 300 is electrically connected to light-source elements 102 and light-sensing elements 200 via a suitable electrical connection such as the aforementioned bus 301 bus or like electrical cable. In an example, some portion of controller 300 resides on PCBs 112.

The processor 302 may be implemented utilizing suitable hardware, such as standard digital circuitry, any of the known processors that are operable for executing software and/or firmware programs, or one or more programmable digital devices or systems, such as programmable read only memories (PROMs), programmable array logic devices (PALs), etc. An exemplary processor 302 is a PIC microprocessor, available from Microchip Technology, Inc., Chandler, Ariz.

Furthermore, although controller 300 is shown as being partitioned into certain functional blocks (namely, processor 302, driver 304, and interface 306), such blocks may be implemented by way of separate circuitry and/or combined into one or more functional units. The processor 302 may execute different software programs to carry out different techniques for computing the one or more positions of one or more touch events TE based on the methods described below.

As discussed above, controller 300 is configured to coordinate the activation of light-source elements 102 and the detection of light 104 by select light-sensing elements 200. An example method of activating light-source elements 102 is the chase method wherein the light-source elements are activated sequentially around the perimeter in a given direction. However, different methods and sequences of activating light-source elements 102 can be employed. For example, if no touch event TE has been sensed after a select amount of time, then the sequencing might drop into a low-power state in which light-source elements 102 are activated less frequently or in a different order (say, odd-numbered light-source elements only). The light-source elements 102 can also be activated at a higher frequency in some cases, e.g., when a touch event TE is first detected, to improve the resolution in determining the position of the touch event.

Single Touch-Event Method

An aspect of the disclosure includes a method of determining a position for a single touch event TE on touch-screen system 10. A first step in the method includes activating each light-source element 102 to generate a corresponding light beam 104. This first step also includes measuring the light-beam intensities at the corresponding light-sensing elements 200 to obtain a baseline measurement of all of the light-beam intensities for the corresponding light-sensing elements. The baseline measurement intensities are represented by the baseline signal strengths of electrical detector signals SD. This baseline measurement allows for a comparison of the baseline intensities of light beams 104 to the touch-event light-beam intensities to establish whether a touch event TE has occurred and where it occurred. An example method of performing this baseline measurement step is discussed below.

The simplest touch position sensing method is based on a triangulation of interrupted (i.e., attenuated) light beams 104 due to touch event TE. In this method, if the attenuation along light-of-sight 105 between a given light-source element 102 and a given light-sensing element 200 due to touch event TE exceeds a predetermined threshold, then that light beam (or, equivalently that line-of-sight) is labeled as being attenuated, interrupted or "broken," as indicated in FIG. 7 by broken light beams 104-B, namely light beams 104-B1, 104-B2, 104-B3 and 104-B4. In FIG. 7, for ease of illustration, only a limited number of broken light beams 104-B are shown.

Figure 8:
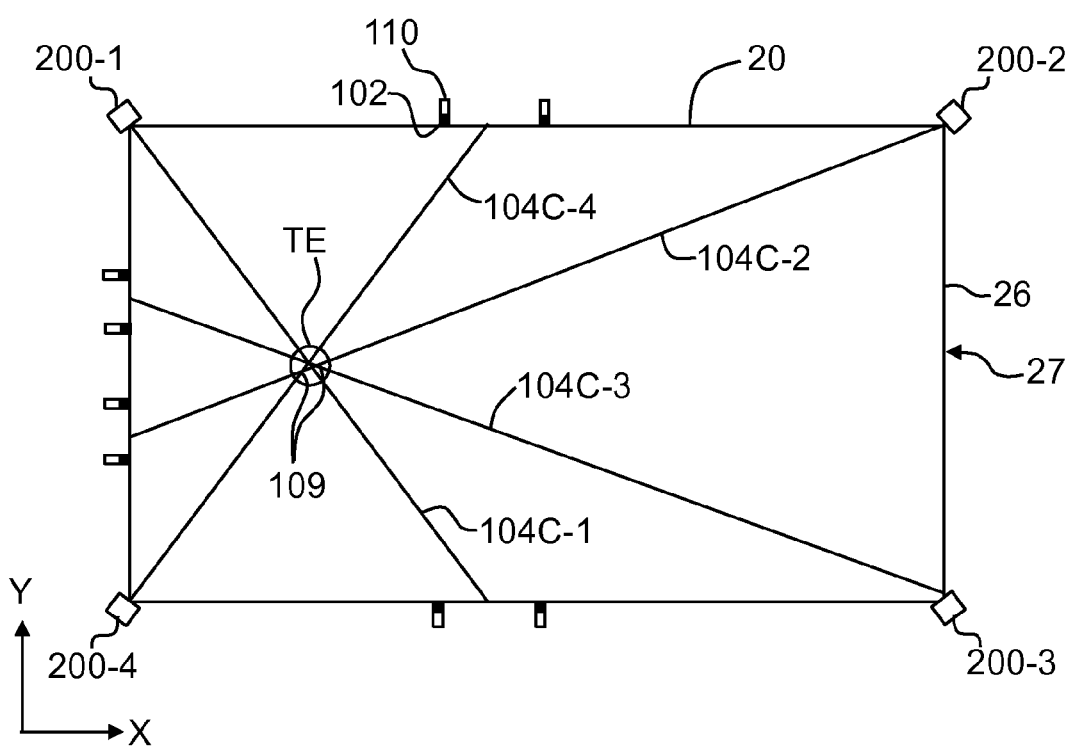
FIG. 8 is similar to FIG. 7 and illustrates a step in the method of determining the position of a touch event by forming central lines associated with the light ray fans (i.e., the lines-of-sight) and determining the intersections of the central lines.

A second step in the method is to replace the fan of broken light beams 104-B with a single central line 104C taken along the center of each fan of the broken light beams. Because there are four light-sensing elements 200, there are four central lines 104C (namely 104-C1 through 104-C4), as shown in FIG. 8.

A third step includes computing the locations of intersections 109 of central lines 104C. For ease of illustration, only some of the intersections 109 are labeled. Due to the limited angular resolution, the central lines 104C will not all intersect at a single point. Rather, the four central lines 104C generally produce a cluster of up to six intersections 109 that have (x,y) positions near the true center of touch event TE. Thus, a fourth step includes averaging the (x,y) coordinates of central-line intersections 109 to give a final estimate (x',y') of the position of touch event TE.

Generally, if t is the number of touch events TE and p is the number of light-sensing elements 200, the maximum number $N_M$ of central-line intersections for the t touch events is $N_M = t^2 p(p-1)/2$. For a single touch event TE, t=1 and $N_M = t^2 p(p-1)/2$. It is noted that the particular example of touch-screen system 10 under consideration has a single touch event TE and four light-sensing elements 200, which yields a maximum of six central-line intersections. Thus, if the actual number $N_A$ of central-line intersections exceeds the maximum number NM, it is an indication that there are multiple touch events than the t touch events assumed.

For example, for a single touch event (t=1) and four light-sensing elements (p=4), if $N_A > 6$, then multiple touch events TE have occurred. Thus, an aspect of the methods disclosed herein includes calculating the maximum number $N_M$ of central-line intersections for the t touch events, measuring the actual number $N_A$ of central-line touch events, and comparing the values of $N_M$ and $N_A$, where $N_A > N_M$ indicates more than t touch events.

This method is particularly useful in the case of discerning whether the number of touch events TE is either one or greater than one, i.e., by measuring a number $N_A$ of actual central line intersections and comparing $N_A$ to the value of $N_M$ associated with a single touch event to determine whether the actual number of touch events TE s greater than one.

Simulations were carried out to compare the actual touch position to the calculated touch position (x',y') to determine the amount of error for the example touch screen parameters set forth above. The simulations indicated the error to be about 0.98 mm, which is much smaller than the example 5.25 mm pitch of light-source elements 102. By testing a number of random points, the worst-case position error was found to be about 3 mm, with the typical error being less than 1 mm.

Method for Two Touch Events

The above-described method works very well for a single touch event TE and can be extended to apply to two touch events. This two-touch-event method is now described.

Figure 9:
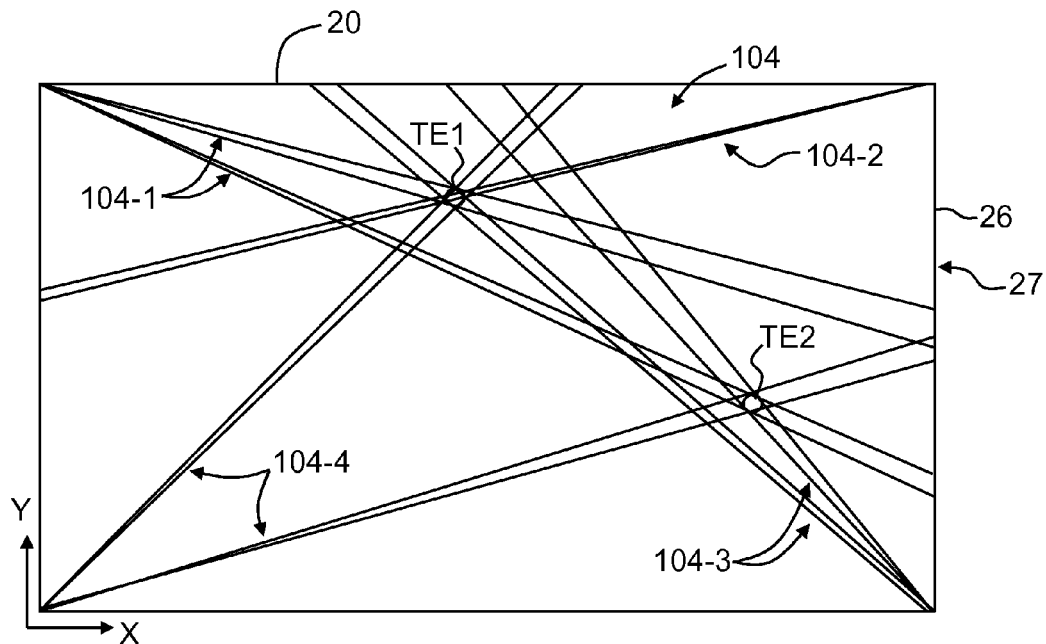
FIG. 9 is similar to FIG. 7 and shows a case consisting of two touch events.
Figure 10:
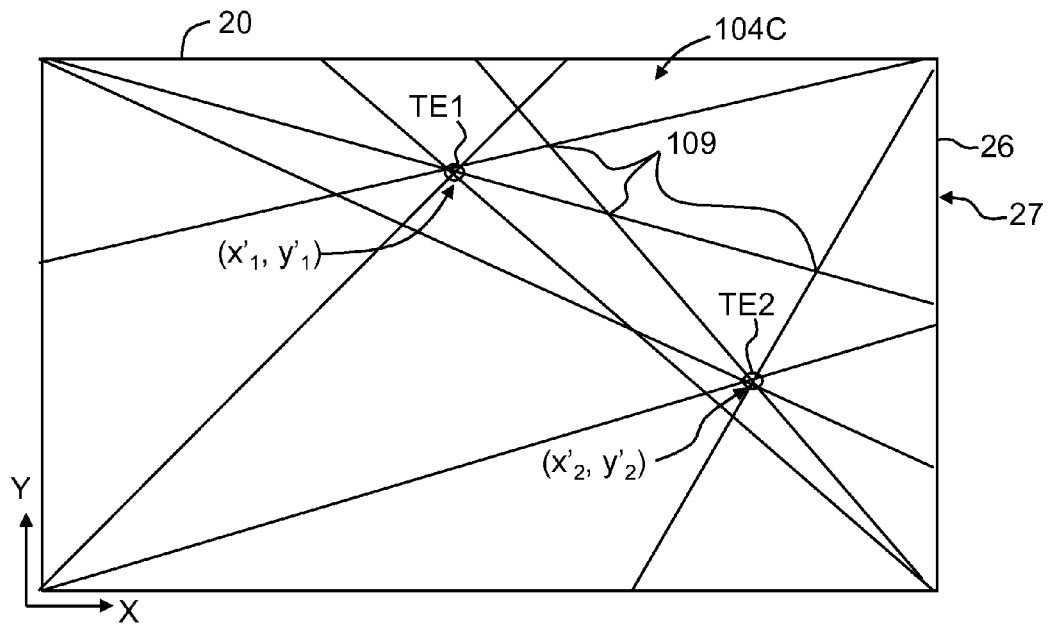
FIG. 10 is similar to FIG. 9 and shows the various central lines associated with the light ray fans (lines-of-sight) of FIG. 9 for the two touch events.

FIG. 9 is similar to FIG. 7 and illustrates the fans of light rays 104 associated with two touch events TE1 and TE2, with just the limiting rays 104-1 through 104-4 shown for ease of illustration. FIG. 10 is similar to FIG. 9, and shows the central lines 104C based on the fans of light rays 104 of FIG. 9. As can be seen in FIG. 10, with two touch events TE1 and TE2, many of the intersections 109 of central lines 104C are not near the true touch event positions. However, it is also observed that the central-line intersections 109 tend to cluster near the positions of touch-events TE1 and TE2. This characteristic of the trajectories of central lines 104C is exploited to calculate the positions $(x'_1, y'_1)$ and $(x'_2, y'_2)$ of the two touch events TE1 and TE2.

Thus, in one embodiment, the intersection coordinates $(x_1, y_1)$, $(x_2, y_2)$, etc. of all of the central-line intersections 109 are calculated in much the same manner as the case involving a single touch event TE. If four light-sensing elements 200 are employed, the maximum number $N_B$ of beam intersections is 6 (see above formula for $N_B$) for a given touch event. Thus, if the number of beam intersections measured is greater than six, then it is concluded that there are at least two touch events TE1 and TE2.

For multiple touch events, the next step in the method includes looking for clusters of central-line intersections 109 because the spurious intersections tend to lie at relatively large distance from the actual positions of the touch events. Again, due to the discrete angular resolution of touch-screen system 10, it is expected that there will be some spread in the central-line intersections 109 associated with the corresponding touch events TE1 and TE2. One way to increase the sensitivity to touch events is to increase the number of light-sensing elements 200. In an example, at least one light-sensing element is arranged along edge 26 mid-way between the adjacent corners 28 to increase the measurement sensitivity for multiple touch events that can occur along the diagonal of transparent sheet 20.

In an example, the requirement for determining that a valid touch event TE has occurred is defined as a minimum number M of central-line intersections 109 that are all within a certain distance tolerance D. An example requirement might be that there be at least M=3 intersections 109 within a circle having a radius D=4 mm. The distance tolerance D and minimum number M of intersections 109 can be selected to optimize the results for establishing the validity of touch event TE. In an example, there may be Q intersections 109 within distance tolerance D, where Q≥M.

In a next step, the method includes averaging the $(x_1, y_1)$, $(x_2, y_2)$, etc. coordinates of the Q≥M intersection clusters to arrive at the calculated positions $(x'_1, y'_1)$ and $(x'_2, y'_2)$ for touch events TE1 and TE2, respectively. As in the single-touch method, in an example the calculated accuracy of the position of touch event TE1 or TE2 can be on the order of a few mm.

The above-described algorithm for multiple touch events TE generally works for two touches but is susceptible to spurious touch results for certain touch-event positions, particularly when the touch event lies near the screen diagonals. This shortcoming is mitigated by tightening the aforementioned central-line intersection requirements, e.g., requiring a greater number M of central-line intersections 109 for a given distance tolerance D.

Example Baseline Measurement Method

As discussed above, one step in the method of determining the position of a touch event TE (or the positions of two touch events TE1 and TE2) includes first performing a baseline measurement of the detector signal strengths when there is no touch event. An example method of carrying out the baseline measurement is now discussed.

The example baseline measurement method provides an estimate for the non-attenuated intensity of each light beam 104 from each light-source element 102 in touch-screen system 10 using light-sensing elements 200. If the estimated detector signal strength associated with detecting an unattenuated light beam 104 with light-sensing element 200 has an amplitude $A_0(t)$ in arbitrary units of strength (e.g., photocurrent in mA), then the generalized current measurement A(t) can be corrected on the fly to give an estimated light-beam transmission function G(t) varying from 0 to 1 for each light beam. For all p light-elements, $G(t) \rightarrow G(p,t)$.

Assuming some knowledge about the average noise of the intensity measurement using light-sensing elements 200, a reasonable detection threshold value T can be defined. For example, if $N_B$ light beams 104 are measured every second, and the detection of a false touch-event cannot occur with a frequency of more than once per K seconds, then the probability of a false touch event can be given by $1/(N_B K)$. If each transmission measurement G(p,t) has a variance $\sigma^2$, then the detection threshold T can be set to $T=G(p,t)=1-z\sigma$, where z is the number of standard deviations as defined by the recursive relationship $erf(z/\sqrt{2})=(NK-1)/NK$, where "erf" is the error function and "$\sqrt{2}$" is the square root of 2.

Table 1 below shows example values for z as a function of the mean time to false touch (MTFT) detection for an example touch-screen system 10 having 256 light beams 104 running at 50 Hz, which gives $N_B K=(256)(50 \text{ Hz})=12,800$. Example touch-screen systems 10 made by the inventors to show proof of principle used switched integrators and had signal-to-noise ratios (SNRs) on the order of 100, resulting in a detection threshold with z=5, and a touch-screen sensitivity of 5%. This detection threshold can be eased by defining a touch event TE as one that requires two or more light beams to be simultaneously broken.

TABLE 1

| MTFT | z |
| --- | --- |
| 1 second | 3.95 |
| 10 seconds | 4.47 |
| 100 seconds | 4.93 |
| 1,000 seconds | 5.37 |

Once the normalized transmission G(t) is established, then the method includes defining two detection states, namely, an idle state ("IDLE") defined as $G(t) \geq T=1-\sigma z$ and a touched stated ("TOUCHED") defined as $G(t)<T=1-\sigma z$. During IDLE times, the deviation of the new samples from G(t) are accumulated and the standard deviation σ is calculated in a straightforward fashion. This calculated standard deviation σ is then used to refine the detection threshold value T under varying illumination levels and various light beam intensities and SNRs.

The baseline measurement method can be performed in touch-screen system 10 using the following example algorithm, in which a mean deviation s rather than an RMS deviation σ is used. Also, a noise multiplier is chosen empirically to reduce false triggering to an acceptable value. The algorithm operates independently and in parallel on each light beam 104. In the algorithm described immediately below, the tracking step $\Delta$ is the amount by which the baseline estimate is changed based on the actual measured signal. The smoothing factor $\epsilon$ is used to smooth out signal variations (see step 7, below).

1. Start with a tracking step $\Delta$, a smoothing factor $\epsilon$, a noise multiplying factor z, reasonable starting estimates of the baseline amplitude $A_0$ and a mean channel noise s.
2. Measure the signal amplitude A for a given light beam 104 for a given line-of-sight 105.
3. If the measured signal amplitude A is above the baseline estimate $A_0$, then set the baseline estimate to the current input signal, causing $A_0$ to track the upper end of a two-sided noise distribution.
4. If the measured signal amplitude A is below the baseline estimate $A_0$, then reduce the baseline estimate $A_0 = A_0 - \Delta$.
5. Set the normalized signal amplitude $G = A/A_0$.
6. If $T = (A_0 - A) > zs$, then indicate a TOUCHED state.
7. Else, if $T = (A_0 - A) \leq zs$, then indicate an IDLE state. Optionally, the estimate for s can be refined here by setting $s = (1-\epsilon)s + \epsilon(A_0 - A)$.
8. Repeat from step 2 for the remaining light beams 104.

Figure 11:
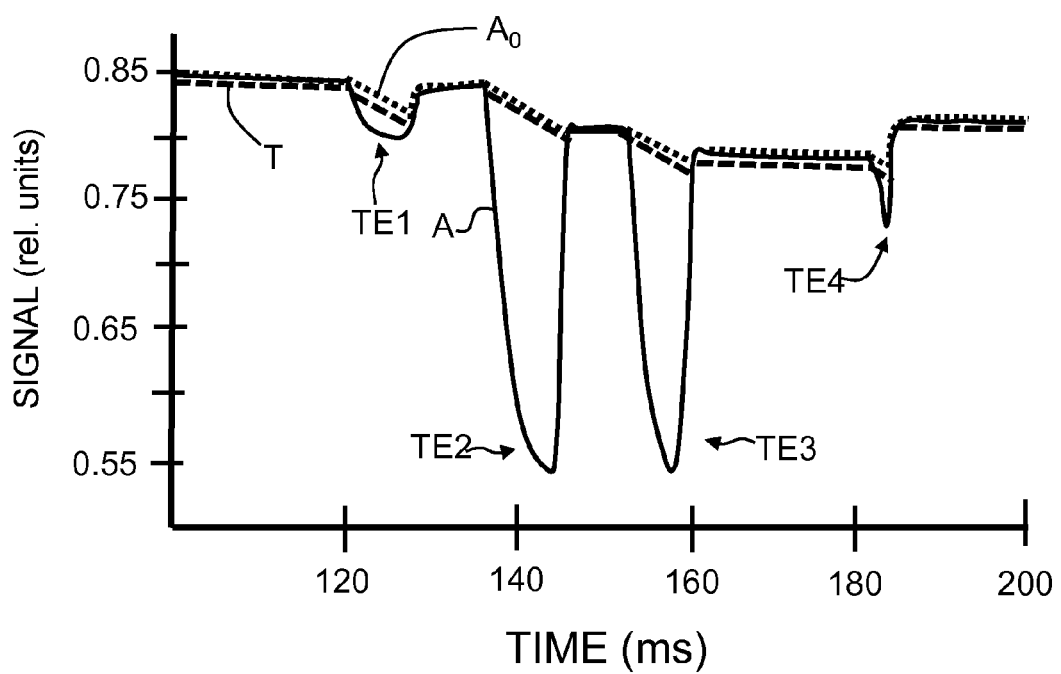
FIG. 11 is a representative plot of the signal strength of the (processed) detector signal (relative units) vs. time (microseconds), based on data obtained from measurements made in an example touch-screen system, for the measured signal A (solid line), the baseline signal $A_0$ (dotted line) and the threshold T (dashed line)

FIG. 11 is a representative plot of the signal strength (relative units) vs. time (microseconds) based on data obtained from measurements made in an example touch-screen system 10, for the measured electrical detector signal SD as denoted by A (solid line), the baseline signal $A_0$ (dotted line) and the signal threshold T (dashed line). The plot illustrates how signal threshold T tracks with the baseline signal $A_0$ and also shows four different touch events TE (namely, TE1 through TE4) that occurred at different times, roughly at 125 ms, 145 ms, 157 ms and 185 ms, respectively.

There are some tradeoffs to be made when selecting the constants $\Delta$, $\epsilon$, z and s. In an example, the tracking step $\Delta$ needs to be set large enough to account for changes in the baseline estimate, but not so large that it obscures a touch event TE by changing the baseline so much that it obscures the occurrence of a touch event. In an example, a maximum signal "droop" is defined, below which the baseline will not be adjusted by $\Delta$. In an example, the value for z can be chosen to be just high enough to eliminate false beam-break events. Some empirical data may be needed to establish a suitable value of z.

The algorithm can be tweaked in a variety of ways known to those skilled in the art to obtain optimum performance under a given set of conditions. By way of example, the algorithm can be made less sensitive to impulse noise, which can cause an unnaturally high baseline value $A_0$. This can be accomplished by tracking the average baseline signal and creating an averaged baseline signal so that any spikes in the measured signal are muted.

Also, adjustments in the baseline signal value $A_0$ can be tuned to handle and distinguish among a wide variety of touch events TE, such as fingerprints on top surface 22 of transparent sheet 20, the cleaning of the top surface, the placing of pressure-sensitive adhesive notes on the screen, etc.

Additionally, the system is capable of utilizing this method to determine the intensity of the touch event TE. This is particularly advantageous for some embodiments where different possible computer processes can be selected based on the intensity of the touch event TE. For example, a strong touch event TE may correspond to the selection or activation of a computer program, whereas a light touch event would correspond to an alternative action.

The baseline tracking methods disclosed herein have a number of advantages. A first is that the non-linear filtering allows for rapid peak tracking and the ability to hold the baseline during touch events. A second is that the touch threshold can be automatically adjusted for dynamic environmental conditions, thereby making the system more robust to detecting touch events and avoiding false-touch events. A third is that the methods can accommodate for touch events that do not return to the previously established baseline, such as steam or residue settling on the top surface 22 of transparent sheet 20. A fourth is that the methods can suppress impulse noise that might otherwise re-set the baseline to an extreme value. A fifth is that the methods can filter out persistent smudges as being touch events.

Touch-Sensitive Display

Figure 12:
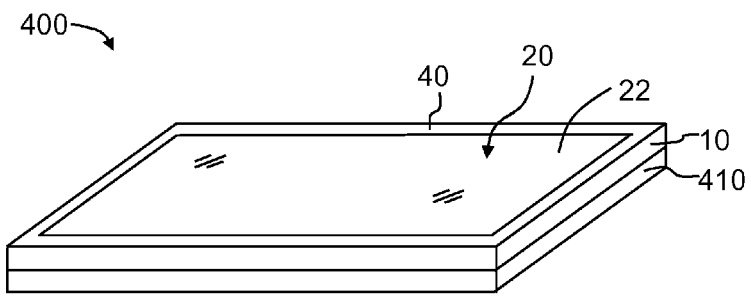
FIG. 12 is a schematic elevated view of an example touch-sensitive display formed by operably arranging the touch-screen system atop a conventional display unit.
Figure 13:
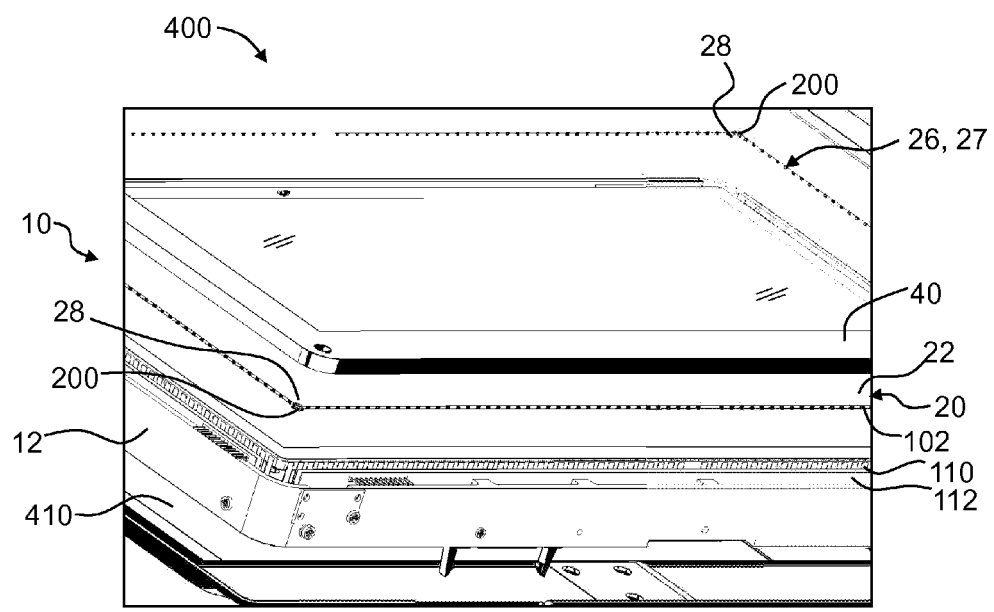
FIG. 13 is an exploded elevated view of an example touch-sensitive display that shows more detail than FIG. 12.

FIG. 12 is a schematic elevated view of an example touch-sensitive display 400 formed by operably arranging touch-screen system 10 adjacent and above (e.g., atop) a conventional display unit 410, such as a liquid crystal display. FIG. 13 is an exploded elevated view of an example touch-sensitive display 400 that shows more detail than FIG. 12. The touch-sensitive display 400 includes bezel 40 that in one example resides atop surface 22 of transparent sheet 20 adjacent edges 26. The touch-screen system 10 is operably arranged atop a display 410 and in an example includes a chassis 12 that supports the various components making up the touch-screen system.

Figure 14A:
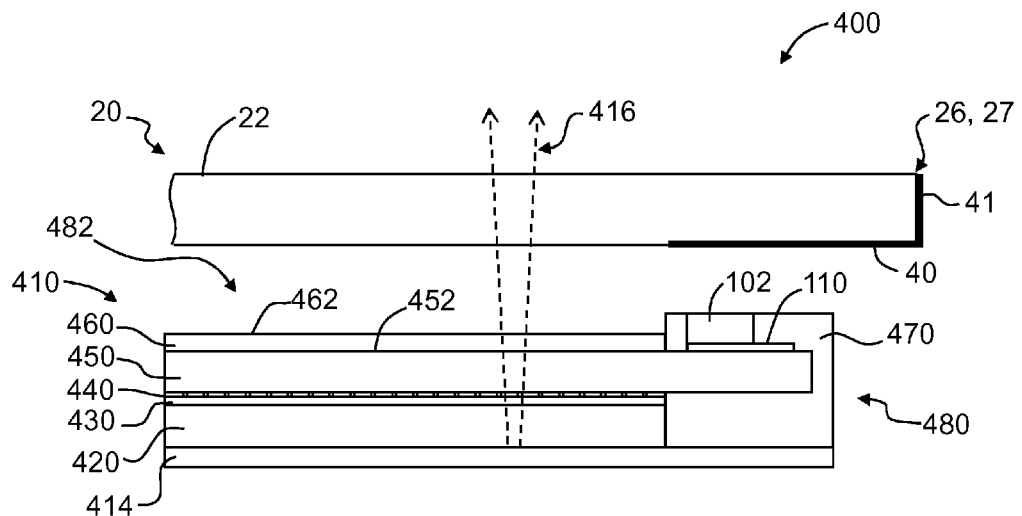
FIG. 14A is a schematic cross-sectional, partial exploded view of an example touch-sensitive display illustrating an example of how to integrate the touch-screen system with a conventional display unit.

FIG. 14A is a schematic cross-sectional, partial exploded view of an example touch-sensitive display 400 illustrating an example of how to integrate touch-screen system 10 with conventional display unit 410. The conventional display unit 410 is shown in the form of a liquid crystal display that includes a backlighting unit 414 that emits light 416, a thin-film transistor (TFT) glass layer 420, a liquid crystal layer 430, a color filter glass layer 450 with a top surface 452, and a top polarizer layer 460 with a top surface 462, all arranged as shown. A frame 470 is disposed around the edge of color filter glass layer 450. The light-source elements 102 are operably supported within frame 470, with flex circuits 110 supported on top surface 452 of color filter glass layer 450 and within the frame. This forms an integrated display assembly 480 having a top side 482.

Figure 14B:
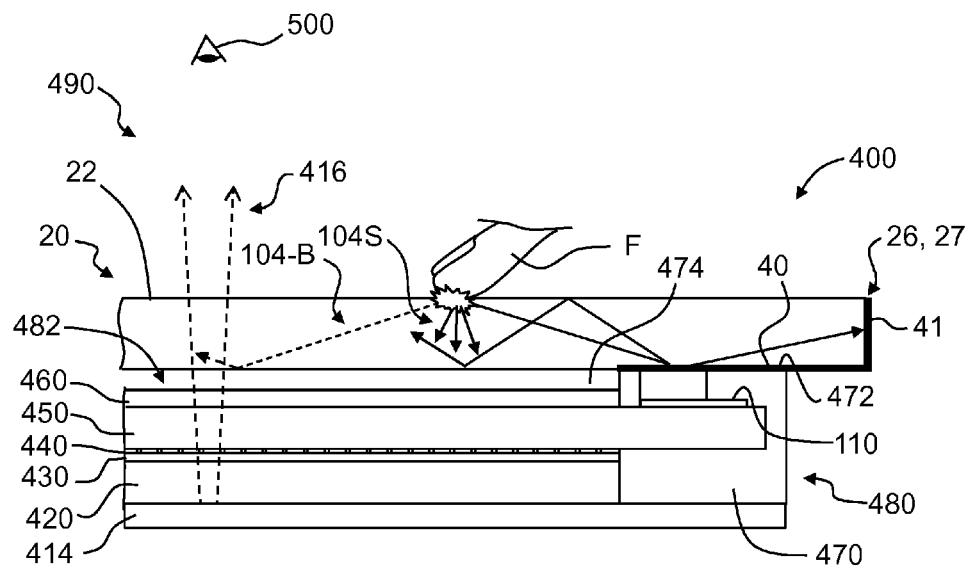
FIG. 14B is similar to FIG. 14A and shows the touch-screen system operably disposed atop the integrated display assembly of the conventional display unit.

With reference now to FIG. 14B, to form the final touch-sensitive display 400, transparent sheet 20 is added to integrated display assembly 480 of conventional display unit 410 by operably disposing the transparent sheet on top side 482 of the assembly. The transparent sheet 20 includes the aforementioned bezel 40 in the form of an IR-transparent but visibly opaque layer. An absorbing layer 41 can also be included at edge 26 of transparent sheet 20 to prevent light 104 from reflecting off the edges of the transparent sheet.

In the embodiment of touch-sensitive display 400 of FIGS. 14A and 14B, light-source elements 102 are face-coupled to bottom 24 of transparent sheet 20 through the IR-transparent bezel 40. There is also an optional air gap 474 formed between transparent sheet 20 and top polarizer layer 460. In an example, various indicia or indicium (not shown) may be presented to user 500 on or through transparent sheet 20 to guide the user to interact with touch-screen system 10. By way of example, the indicium may include areas on top surface 22 of transparent sheet 20 that are set aside for indicating user choices, software execution, etc.

Further Light-Sensing Element Arrangements

In an example embodiment of touch-screen system 10 illustrated in FIG. 6A and FIG. 6B, the light-source elements 102 are mounted on bottom surface 24 of transparent sheet 20 at or near perimeter 27. In this configuration, as much as half of light 104 shines directly through transparent sheet 20 and into the space above where the user 500 resides. If an object happens to be near top surface 22 of transparent sheet 20, such the user's hand (not shown), it can reflect a portion of light 104, and some of this reflected light can find is way to one of the light-sensing elements 200. If the object moves away, then the same light-sensing element that detected the reflected light from the object will now cease to sense such light. This even will be represented in the detector signal and can mimic a touch event TE. This mimicked touch-event signal is also called a "hover signal," because it caused by an object hovering above top surface 22 of transparent sheet 20.

To ensure that only actual touch events are detected by touch-screen system 10, only guided light 104 traveling in body 21 of transparent sheet 20 by total internal reflected can be detected by light-sensing elements 200. Certain embodiments discussed above such as those shown in FIG. 6A and FIG. 6B address the problem suppressing ambient light.

Figure 15A:
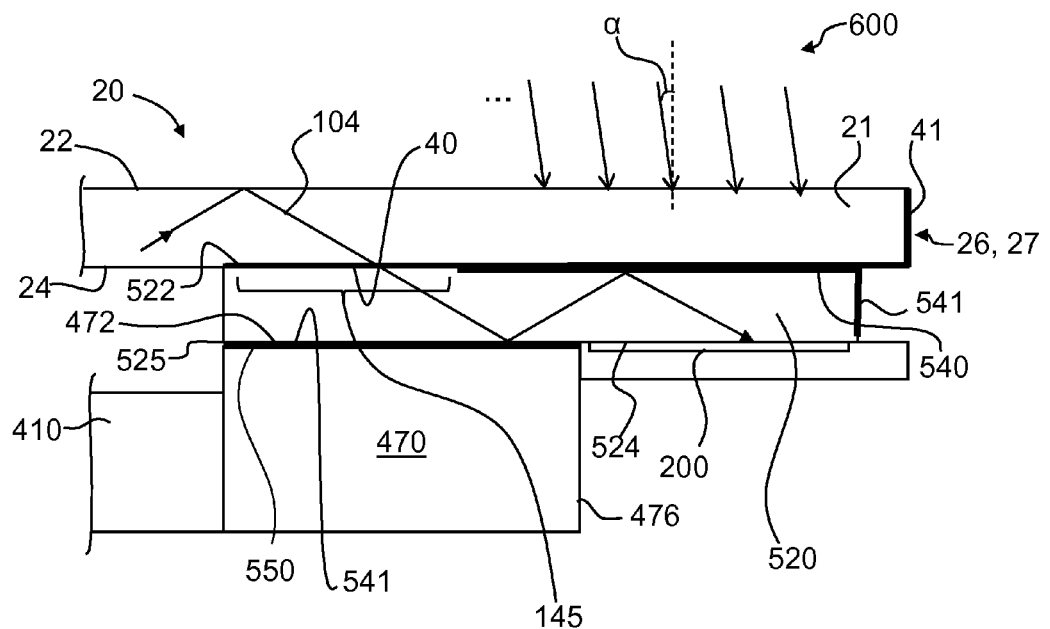
FIG. 15A is a close-up partial cross-sectional view of an example configuration for a touch-sensitive display that is useful for reducing the adverse effects of ambient light.

FIG. 15A is a close-up partial cross-sectional view of an example configuration for touch-sensitive display 400 that is useful for reducing the adverse effects of ambient light 600 (and in particular, sunlight) on the detection of light 104 from light-source elements 102. The example configuration includes a slab waveguide 520 having a top surface 522 and a bottom surface 524. The slab waveguide 520 is disposed with its top surface 522 adjacent bottom surface 24 of transparent sheet 20. The slab waveguide 520 is arranged adjacent edge 26 of transparent sheet 20 and extends a short distance inward so that it at least covers light-sensing elements 200. One of the light-sensing elements 200 is shown in the cross-sectional view.

The slab waveguide 520 is stood off from a frame upper surface 472 by stand-off members 550 disposed between the frame upper surface and bottom surface 524 of the slab waveguide. An IR-transparent bezel 40 disposed on bottom surface 24 of transparent sheet 20 serves as a filter that blocks visible light but that transmits IR light 104. A reflecting layer 540 is disposed on a portion of top surface 522 of slab waveguide 520, and serves to assist in reflecting IR light 104 toward light-sensing element 200, which is disposed adjacent a portion of bottom surface 524 of the slab waveguide. In an example, frame upper surface 472 includes a light-absorbing layer 541.

By using bezel 40 as an IR filter that passes light 104 having an IR wavelength of about 950 nm but that blocks other wavelengths of light including those of ambient light 600, such as sunlight, room light or any other light that is not light 104, light-sensing element 200 can detect light 104 without substantial interference from the ambient light. The reflecting layer 540 acts as a shield to prevent ambient light 600 from being directly incident upon light-sensing element 200 while also assisting in reflecting light 104 toward the light-sensing element. Here, this reflecting assistance may include reflecting light 104 that might not otherwise reflect within body 21 of transparent sheet 20 by total internal reflection.

With continuing reference to FIG. 15A, consider light 104 traveling within body 21 of transparent sheet 20 via total internal reflection. As a given light ray 104 traverses transparent sheet 20 toward light-sensing element 200, it has an opportunity to enter slab waveguide 520 at a window 145 defined by the beginning of the mini waveguide and the leading edge of reflecting layer 540. The light rays 104 that do not enter this window 145 continue traveling in transparent sheet body 21 and eventually are absorbed at edge 26 by absorbing layer 41 disposed thereon.

The light rays 104 that enter window 145 have an opportunity to be incident upon light-sensing member 200. To do so, light ray 104 must undergo internal reflection within mini waveguide 520 at its lower surface 524 and reflect from reflecting layer 540 to travel toward light-sensing element 200. Note that reflecting layer 540 prevents light ray 104 from re-entering transparent sheet 20 and generally provides no opportunity for the light ray to escape prior to striking light-sensing element 200.

Now consider ambient light (i.e., ambient light rays) 600. The behavior of ambient light rays 600 depends in part upon the incident angle $\alpha$ that the ambient light rays make with top surface 22 of transparent sheet 20. If the incident angle $\alpha$ is very shallow (i.e., $\alpha$ is close to 90 degrees, or grazing incidence), ambient light rays 600 will be reflected from top surface 22 and not enter transparent sheet body 21. The ambient light rays 600 having a smaller incident angle $\alpha$ will travel directly through transparent sheet 20. If such ambient light rays 600 are incident upon reflecting layer 540, they will be reflected back out of top surface 22 of transparent sheet 20.

If ambient light rays 600 pass through transparent sheet 20 and also pass through window 145 and into slab waveguide 520, then visible wavelengths will be absorbed by the IR-transparent bezel 40. The IR portion of ambient light rays 600 will continue traveling but will exit bottom surface 524 of slab waveguide 520, passing through an air gap 525 between frame upper surface 472 and the bottom surface of the slab waveguide. This IR-component of ambient light rays 600 is absorbed by the absorbing layer 541 on frame upper surface 472 of frame 470.

Thus, the configuration of FIG. 15A enhances the detection of light 104 in light-sensing elements 200 in the presence of ambient light 600, substantially preventing the ambient light from reaching the light-sensing elements. This is advantageous for any touch-screen system 10 that may be used outside in direct ambient light 600, particularly sunlight.

Figure 15B:
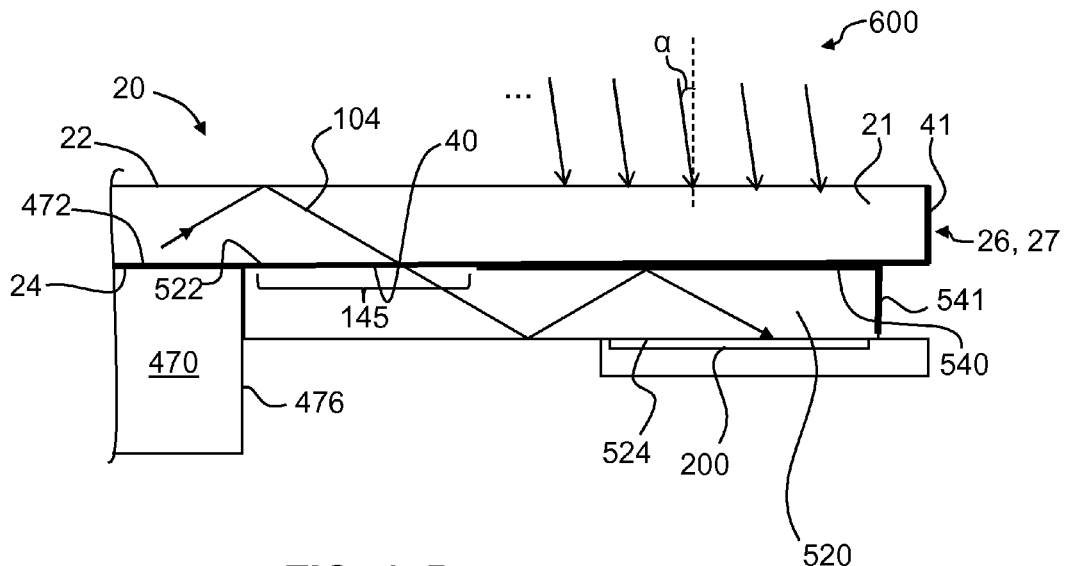
FIG. 15B is similar to FIG. 15A and illustrates an example touch-sensitive display having a thinner configuration than that of FIG. 15A.

FIG. 15B is similar to FIG. 15A and illustrates an example embodiment wherein touch-sensitive display 400 has a thinner configuration than that of FIG. 15A. In the configuration of FIG. 15B, slab waveguide 520 now resides adjacent a side 476 of frame 470 rather than atop upper surface 472 of the frame. In this embodiment, IR-transparent bezel 40 is extended by the width of frame 470.

Figure 15C:
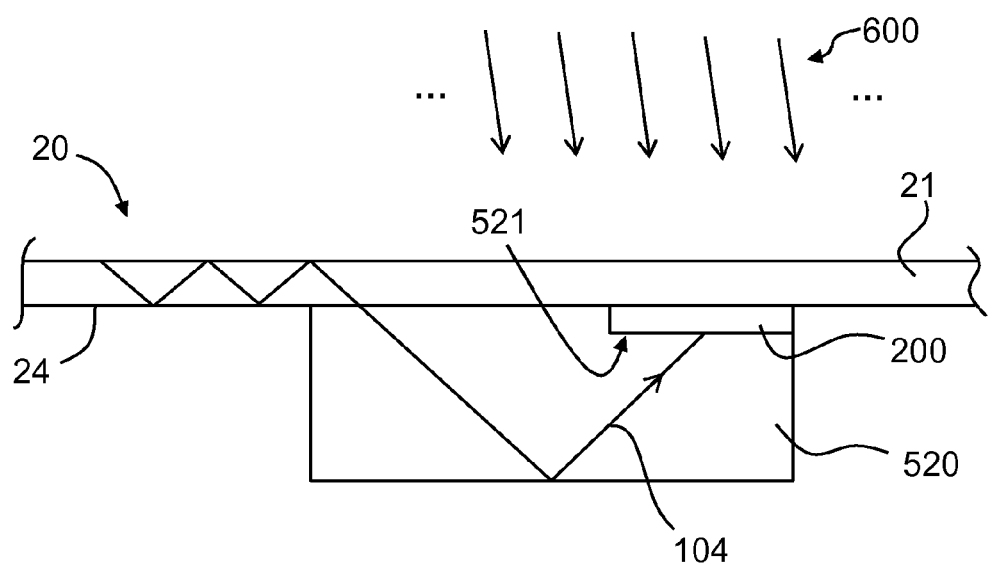
FIG. 15C is similar to FIG. 15B and illustrates an example embodiment where the light-sensing element is disposed so that it faces upside-down.

FIG. 15C is similar to FIG. 15B and illustrates an example embodiment where light-sensing element 200 is disposed so that it faces upside-down. In this configuration, light 104 enters slab waveguide 520 which is configured relative to transparent sheet 10 so that the light is totally internally reflected upward towards light-sensing element 200. Slab waveguide 520 includes a shelf 521 configured to accommodate light-sensing element 200. This configuration is advantageous in that the light-detecting element 200 faces away from the general direction of ambient light 600. It also obviates the need for IR-transparent bezel 40.

Figure 15D:
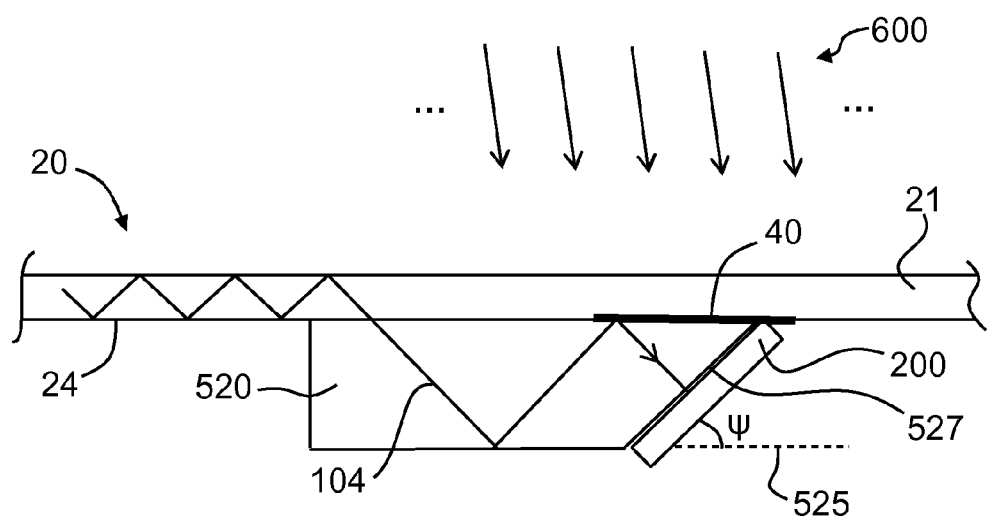
FIG. 15D is similar to FIG. 15C and illustrates an example embodiment where the light-sensing element is disposed adjacent an angled facet of the slab waveguide at a detector angle ψ relative to the horizontal.

FIG. 15D is similar to FIG. 15C and illustrates an example embodiment where light-sensing element 200 is disposed adjacent an angled facet 527 of slab waveguide 520 at a detector angle $\psi$ relative to the horizontal. In an example, "horizontal" is defined relative to a plane 525 defined by planar bottom surface 524 of slab waveguide 520. In an example, detector angle $\psi$ can be between 0 and 90 degrees, while in another example can be between 0 and 135 degrees. In the case where ambient light 600 could be incident upon light-source element 200, IR-transparent bezel 40 can be disposed between slab waveguide 520 and transparent sheet 20 to cover the light-source element.

Although the embodiments herein have been described with reference to particular aspects and features, it is to be understood that these embodiments are merely illustrative of desired principles and applications. It is therefore to be understood that numerous modifications may be made to the illustrative embodiments and that other arrangements may be devised without departing from the spirit and scope of the appended claims.

What is claimed is:

1. A touch-screen system for sensing a location of a touch event, comprising:
    a transparent sheet having a top surface, a bottom surface, and a perimeter that includes an edge, wherein the touch event occurs on the top surface;
    a plurality of light-source elements that emit light and that are disposed adjacent the perimeter either adjacent the edge or adjacent the bottom surface substantially at the edge, so as to couple the light into the transparent sheet to travel therein via total internal reflection;
    a plurality of light-sensing elements operably disposed only adjacent the edge to detect the light that travels within the transparent sheet and along lines-of-sight from each of the light sources to the light-sensing elements, the light-sensing elements each being configured to generate detector signals having a signal strength representative of a detected light intensity, wherein the touch event causes attenuation of the light intensity along at least one of the lines-of-sight;
    a slab waveguide in contact with the bottom of the transparent sheet and disposed only adjacent the edge and between the bottom of the transparent sheet and at least one of the light-sensing elements such that the lines-of-sight pass from the transparent sheet through the slab waveguide and to the at least one of the light-sensing elements even in the absence of the touch event; and
    a controller operably coupled to the light-source elements and the light-sensing elements and configured to control the emission of the light from the light-source elements and process the detector signals to compare the detector signal strength to a signal threshold to establish attenuated lines-of-sight.

2. The system according to claim 1, wherein the controller is further configured to define central lines associated with the attenuated lines of sight to establish a plurality of locations of intersections of the central lines, and to average the plurality of intersection locations to establish the touch-event location.

3. The system according to claim 1, wherein the controller is further configured to determine the intensity of the touch event based on a comparison of the detector signal strength to a signal threshold.

4. The system according to claim 1, wherein ambient visible light is incident upon the transparent sheet, and further comprising:
    an IR-transparent layer that is opaque to the visible light and that is disposed atop a first portion of the slab waveguide upper surface and only adjacent the perimeter, so that IR-transparent layer prevents the ambient light from reaching the light-sensing elements that are disposed only adjacent the edge of the transparent sheet.

5. The system according to claim 4, further comprising:
    a reflecting layer disposed atop a second portion of the waveguide upper surface and adjacent the first portion, the reflecting layer being opaque to visible and IR light;
    wherein the IR-transparent layer allows IR light from the light-source elements to pass into the slab waveguide and travel therein via total internal reflection, and wherein the reflecting layer reflects the internally reflected IR light to the light-sensing element and blocks ambient light from being directly incident upon the light-sensing element.

6. The system according to claim 1, further comprising a display unit disposed adjacent the bottom surface of the transparent sheet so that a user views the display unit through the transparent sheet.

7. The system according to claim 1, wherein the light emitted by the light-source elements comprises infrared light, wherein the light-source elements that are disposed only adjacent the edge of the transparent sheet are disposed adjacent the bottom surface of the transparent sheet substantially adjacent the perimeter, and further comprising an IR-transparent film between the light-source elements and the transparent sheet, wherein the IR-transparent film is opaque to visible light.

8. A method of determining a location of a touch event on a transparent sheet, comprising:
    sending light from light-source elements to light-sensing elements over lines-of-sight therebetween, wherein the light-source elements and light-sensing elements are operably disposed only adjacent a perimeter of the transparent sheet, wherein the light travels within the transparent sheet via total internal reflection;
    disposing the light-sensing elements adjacent a slab waveguide that resides only adjacent the perimeter of the transparent sheet and that is in contact with a bottom surface of the transparent sheet such that the lines-of-sight pass from the transparent sheet through the slab waveguide and to the light-sensing elements even in the absence of the touch event;
    determining the lines-of-sight over which light is attenuated by the touch event, thereby defining attenuated lines-of-sight;
    defining a central line for the attenuated lines-of-sight associated with each light-sensing element;
    determining locations of intersections of the central lines; and
    averaging the locations of the intersections of the central lines to establish the location of the touch event.

9. The method according to claim 8, further comprising determining the intensity of the touch event based on a comparison of the detector signal strength to a signal threshold.

10. The method according to claim 8, wherein the transparent sheet has four edges that define four corners, and further comprising arranging the light-source elements along the four edges and arranging four of the light-sensing elements one at each of the four corners.

11. The method according to claim 8, further comprising:
    sequentially activating the light-source elements to sequentially send the light over the lines-of-sight.

12. The method according to claim 11, further comprising:
    detecting the light at the light-sensing elements to generate respective detector signals each having strength representative of an intensity of the detected light; and
    wherein said determining of the lines-of-sight over which light is attenuated by the touch event includes processing the detector signals to compare the detector signal strength to a threshold signal strength.

13. The method according to claim 11, further comprising:
    establishing a baseline measurement of light traveling over the lines-of-sight;
    defining the threshold signal strength based on the baseline measurement; and
    comparing the detector signal strengths associated with the attenuated lines-of-sight to the threshold signal strength to determine whether the touch event occurred.

14. The method according to claim 13, further comprising:
    adjusting the baseline measurement based on changes in the detector signal strength; and adjusting the threshold signal strength based on the adjusted baseline measurement.

15. The method according to claim 8, further comprising:
operably disposing a display unit underneath the transparent sheet.

16. The method according to claim 8, further including:
determining a maximum number $N_M$ of central-line intersections for the touch event via the relationship $N_M = p(p-1)/2$, wherein p is the number of light-sensing elements;
measuring a number $N_A$ of actual central line intersections and comparing $N_A$ to $N_M$ to determine whether the actual number of touch events is greater than one.

17. The method according to claim 8, further comprising:
identifying a number Q of central-line intersections equal to or greater than a minimum number M of central-line positions that are all within a certain distance tolerance D of each other; and
averaging the Q central-line positions to determine a location of one of the multiple touch events.

18. The method according to claim 8, further comprising viewing a display unit through the transparent sheet.

\* \* \* \* \*